(12) United States Patent
Young

(10) Patent No.: US 7,780,389 B1
(45) Date of Patent: Aug. 24, 2010

(54) DOOR INSTALLATION SYSTEM

(75) Inventor: Roland O. Young, Grand Forks, ND (US)

(73) Assignee: Telpro, Inc., Grand Forks, ND (US)

( * ) Notice: Subject to any disclaimer, the term of this patent is extended or adjusted under 35 U.S.C. 154(b) by 378 days.

(21) Appl. No.: 11/874,886

(22) Filed: Oct. 18, 2007

(51) Int. Cl.
E04G 21/14 (2006.01)
B66F 11/00 (2006.01)

(52) U.S. Cl. .................. 414/11; 414/684.3; 280/43.22; 280/79.7

(58) Field of Classification Search ................ 211/41.1, 211/41.15, 41.16; 212/166; 254/7 R; 269/152, 269/17, 905; 280/43.17–43.19, 43.22, 652, 280/654–655, 79.7; 29/281.5; 414/10–12, 414/684.3, 743
See application file for complete search history.

(56) References Cited

U.S. PATENT DOCUMENTS

| | | | | |
|---|---|---|---|---|
| 2,503,388 A * | 4/1950 | Hedlund | ...................... | 414/10 |
| 2,967,627 A * | 1/1961 | Vinson | ........................ | 254/2 R |
| 3,269,744 A * | 8/1966 | Dobson | .................... | 280/43.17 |
| 3,667,774 A * | 6/1972 | Selley | ...................... | 280/43.17 |
| 3,729,209 A * | 4/1973 | Litz | ............................ | 280/652 |
| 3,807,720 A * | 4/1974 | Converse et al. | .............. | 269/40 |
| 4,278,244 A * | 7/1981 | Carter | ......................... | 269/17 |
| 4,978,132 A * | 12/1990 | Wilson et al. | .......... | 280/47.131 |
| 5,584,635 A | 12/1996 | Stapelmann | | |
| 5,762,348 A | 6/1998 | Echternacht | | |
| 6,231,034 B1 | 5/2001 | Walker et al. | | |
| 6,338,758 B1 * | 1/2002 | Curran | ....................... | 118/500 |
| 7,014,413 B2 | 3/2006 | Young | | |
| 7,104,409 B2 * | 9/2006 | Morgan | ...................... | 211/41.1 |
| 2001/0016156 A1* | 8/2001 | Echternacht | ................. | 414/11 |
| 2007/0235968 A1* | 10/2007 | Krizan et al. | ............. | 280/79.7 |

* cited by examiner

*Primary Examiner*—Gregory W Adams
(74) *Attorney, Agent, or Firm*—Michael S. Neustel

(57) ABSTRACT

A door installation system for safely installing or removing a heavy door by a single person. The door installation system generally includes a base, a vertical member extending from the base in an upward manner, a brace member extending between the base and the vertical member, a guide structure attached to the upper portion of the vertical member for guiding an upper portion of a door, and a carriage removably attachable to the base. The carriage is capable of adjusting the attitude of a door being installed to fit within a door jamb. The vertical member and the base are pivotally connected to one another to allow for folding into a compact structure.

13 Claims, 30 Drawing Sheets

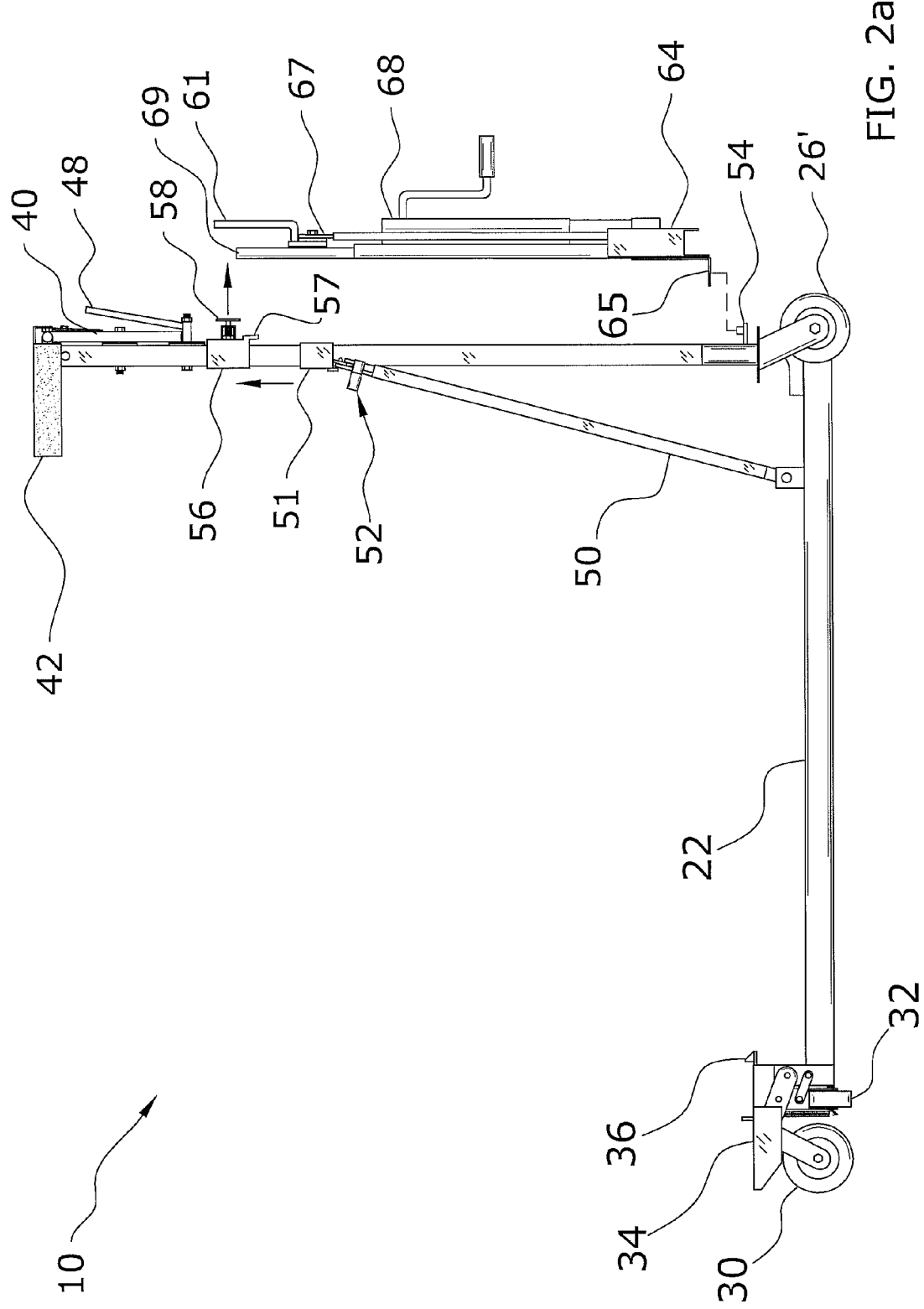

DOOR INSTALLATION SYSTEM

CROSS REFERENCE TO RELATED APPLICATIONS

The Applicant has filed U.S. application Ser. No. 11/874,204 on Oct. 18, 2007. No claim of priority is made to U.S. application Ser. No. 11/874,204.

STATEMENT REGARDING FEDERALLY SPONSORED RESEARCH OR DEVELOPMENT

Not applicable to this application.

BACKGROUND OF THE INVENTION

1. Field of the Invention

The present invention relates generally to door installers and more specifically it relates to a door installation system for safely installing or removing a heavy door by a single person.

2. Description of the Related Art

Any discussion of the related art throughout the specification should in no way be considered as an admission that such related art is widely known or forms part of common general knowledge in the field.

Conventional door installers are typically comprised of a structure that receives a door upon a front loading structure. Conventional door installers incline the door rearwardly to prevent the door from falling forwardly. U.S. Pat. No. 7,014,413 to Roland O. Young titled "Door Attaching Apparatus" and U.S. Pat. No. 5,584,635 to Frank Stapelmann titled "Carriage for a Construction Panel" both disclose door installers that have a front loading structure that incline the door rearwardly.

One of the main problems with conventional door installers is that they are not capable of installing or removing heavy doors (e.g. fire doors) which can exceed 200 pounds because of the inherent instability of transporting a heavy door on a front loading structure. Some heavy doors are approximately 400 pounds and can be up to 10 feet in height creating significant tipping forces. When attempting to move a conventional door installer with a heavy door, there is a significant risk that the load will overbalance the door installer resulting in the tipping of the heavy door which can cause physical harm to a person and damage to the heavy door. Another problem with conventional door installers is that they typically require 2 or more workers to utilize because of their inherent stability when working with a heavy door.

Because of the inherent problems with the related art, there is a need for a new and improved door installation system for safely installing or removing a heavy door by a single person.

BRIEF SUMMARY OF THE INVENTION

The general purpose of the present invention is to provide a door installation system that has many of the advantages of the door installers mentioned heretofore. The invention generally relates to a door installer which includes a base, a vertical member extending from the base in an upward manner, a brace member extending between the base and the vertical member, a guide structure attached to the upper portion of the vertical member for guiding an upper portion of a door, and a carriage removably attachable to the base. The carriage is capable of adjusting the attitude of a door being installed to fit within a door jamb. The vertical member and the base are pivotally connected to one another to allow for folding into a compact structure.

There has thus been outlined, rather broadly, some of the features of the invention in order that the detailed description thereof may be better understood, and in order that the present contribution to the art may be better appreciated. There are additional features of the invention that will be described hereinafter and that will form the subject matter of the claims appended hereto.

In this respect, before explaining at least one embodiment of the invention in detail, it is to be understood that the invention is not limited in its application to the details of construction or to the arrangements of the components set forth in the following description or illustrated in the drawings. The invention is capable of other embodiments and of being practiced and carried out in various ways. Also, it is to be understood that the phraseology and terminology employed herein are for the purpose of the description and should not be regarded as limiting.

An object is to provide a door installation system for safely installing or removing a heavy door by a single person.

Another object is to provide a door installation system that is capable of installing and removing heavy doors exceeding 200 pounds.

An additional object is to provide a door installation system that reduces the chance of injury to a person installing a door.

A further object is to provide a door installation system that reduces the chance of damage to a door being installed or to the surrounding building structures.

Another object is to provide a door installation system that may be operated by a single person.

Another object is to provide a door installation system that allows for adjustment of the attitude of a door along various axes.

Another object is to provide a door installation system that maintains a door centrally positioned in a substantially vertical manner without significant inclination during transport.

Another object is to provide a door installation system that provides a stable base for transporting, installing or removing a heavy door.

Another object is to provide a door installation system that efficiently installs or removes a door.

Another object is to provide a door installation system that easily adjusts to accommodate left swing doors or right swing doors while keeping the door centrally positioned.

Another object is to provide a door installation system that provides a narrow base at the end adjacent the door hinge allowing for easy positioning for door installation.

Another object is to provide a door installation system that allows for easy loading of the door onto the carriage without having to manually lift the door.

Another object is to provide a door installation system that does not require the usage of straps or a secondary apparatus to maintain the position of the door.

Another object is to provide a door installation system that accommodates various widths of doors (e.g. 4 feet, 5 feet).

Another object is to provide a door installation system that may be retracted into a compact storage position.

Another object is to provide a door installation system that provides easy steering when transporting a heavy door.

Another object is to provide a door installation system that prevents unexpected motion when installing or removing a door.

Another object is to provide a door installation system that ensures constant contact with the floor at all time by all wheels thereby increasing stability.

Other objects and advantages of the present invention will become obvious to the reader and it is intended that these objects and advantages are within the scope of the present invention. To the accomplishment of the above and related objects, this invention may be embodied in the form illustrated in the accompanying drawings, attention being called to the fact, however, that the drawings are illustrative only, and that changes may be made in the specific construction illustrated and described within the scope of the appended claims.

BRIEF DESCRIPTION OF THE DRAWINGS

Various other objects, features and attendant advantages of the present invention will become fully appreciated as the same becomes better understood when considered in conjunction with the accompanying drawings, in which like reference characters designate the same or similar parts throughout the several views, and wherein:

FIG. 2a is a side view of the present invention with the carriage being attached to the vertical member.

DETAILED DESCRIPTION OF THE INVENTION

A. Overview

Figure 1A:
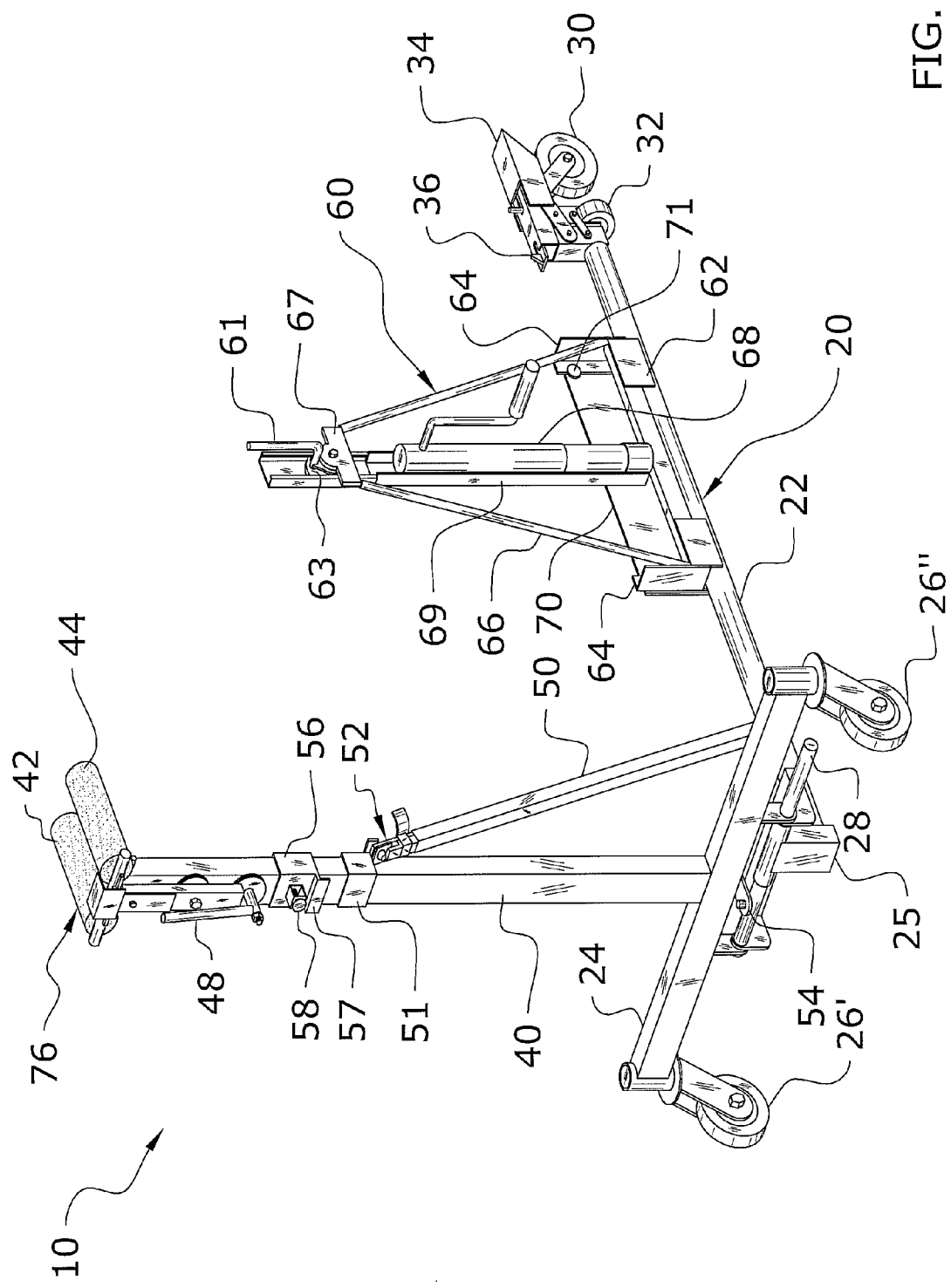
FIG. 1a is an upper perspective view of the present invention.

Turning now descriptively to the drawings, in which similar reference characters denote similar elements throughout the several views, FIGS. 1 through 7c illustrate a door installation system 10, which comprises a base 20, a vertical member 40 extending from the base 20 in an upward manner, a brace member 50 extending between the base 20 and the vertical member 40, a guide structure 76 attached to the upper portion of the vertical member 40 for guiding an upper portion of a door, and a carriage 60 removably attachable to the base 20. The carriage 60 is capable of adjusting the attitude of a door being installed to fit within a door jamb 16. The vertical member 40 and the base 20 are pivotally connected to one another to allow for folding into a compact structure.

B. Base

Figure 1B:
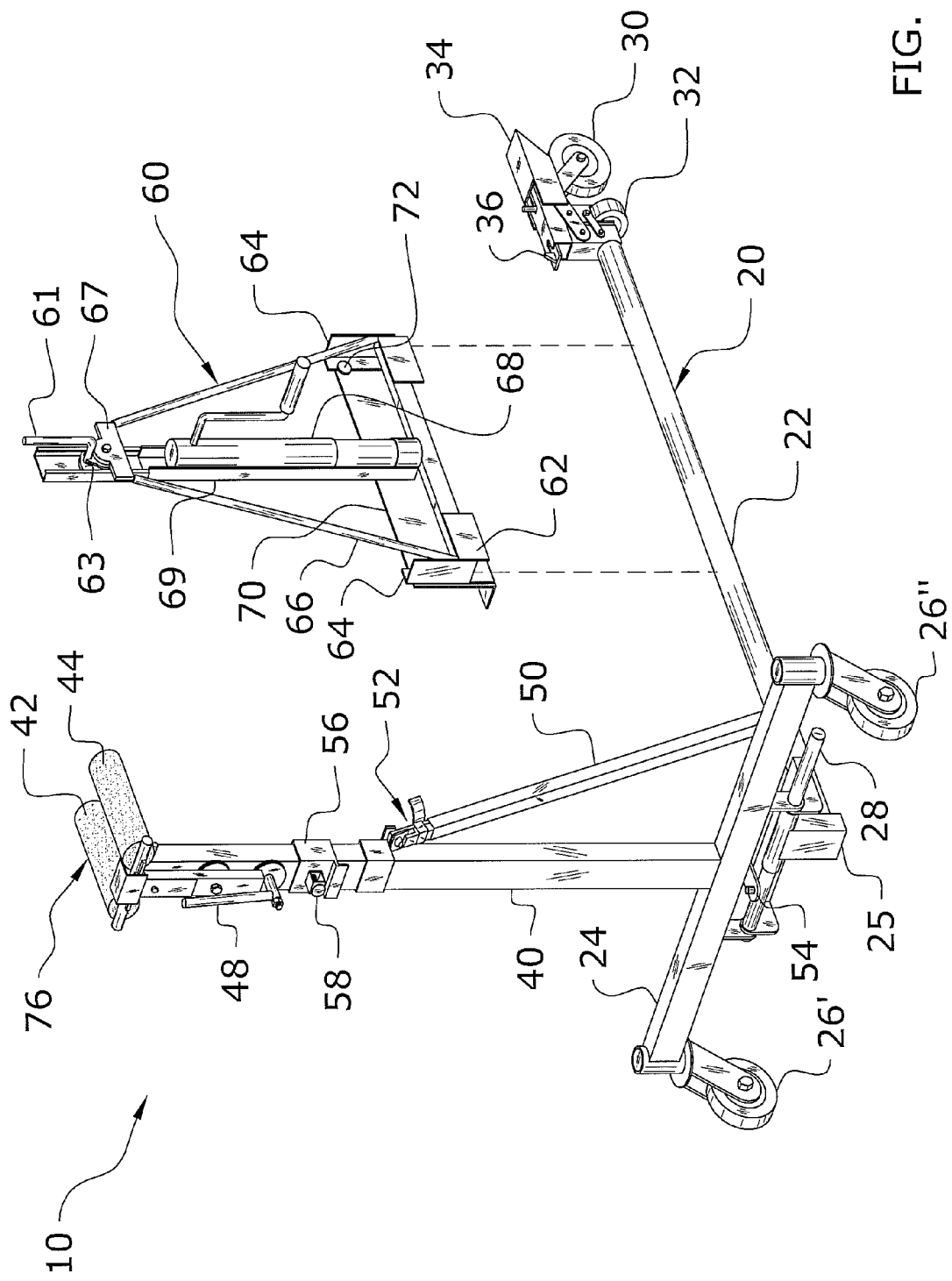
FIG. 1b is an upper perspective view of the present invention with the carriage removed from the base.

FIGS. 1a and 1b best illustrate the base 20. The base 20 is preferably comprised of an elongated structure having a distal end and an inner end. The base 20 includes a horizontal member 22 as best illustrated in FIG. 1a of the drawings. The base 20 is preferably at least four feet in length to accommodate various widths of doors as the door is positioned substantially parallel with respect to the length of the base 20

The upper surface of the base 20 supports the carriage 60 during loading, transport and unloading of the door with respect to the present invention. The base 20 preferably includes a curved upper surface for pivoting the carriage 60 upon in operation of the present invention as illustrated in FIGS. 1a and 1b of the drawings. The base 20 may be comprised of a tubular structure having a circular cross sectional shape as illustrated in the drawings.

The base 20 is preferably comprised of a straight structure, however various non-straight structures may be utilized for the base 20. The base 20 is preferably comprised of a narrow structure to allow for positioning a door 12 near a door jamb 16 without interference by the base 20. In particular, the base 20 is preferably comprised of a width less than three inches.

Figure 2B:
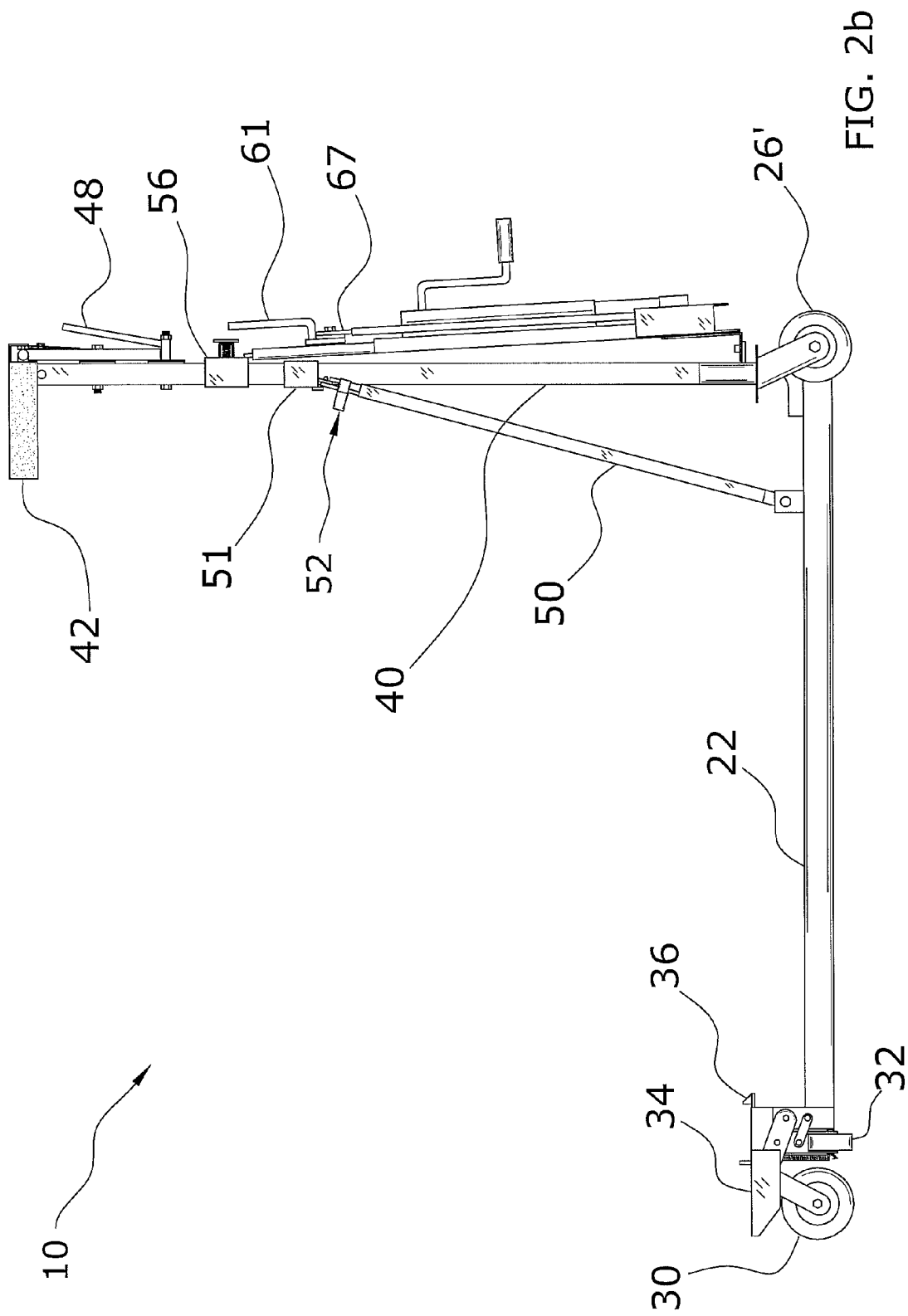
FIG. 2b is a side view of the present invention with the carriage attached to the vertical member.
Figure 2C:
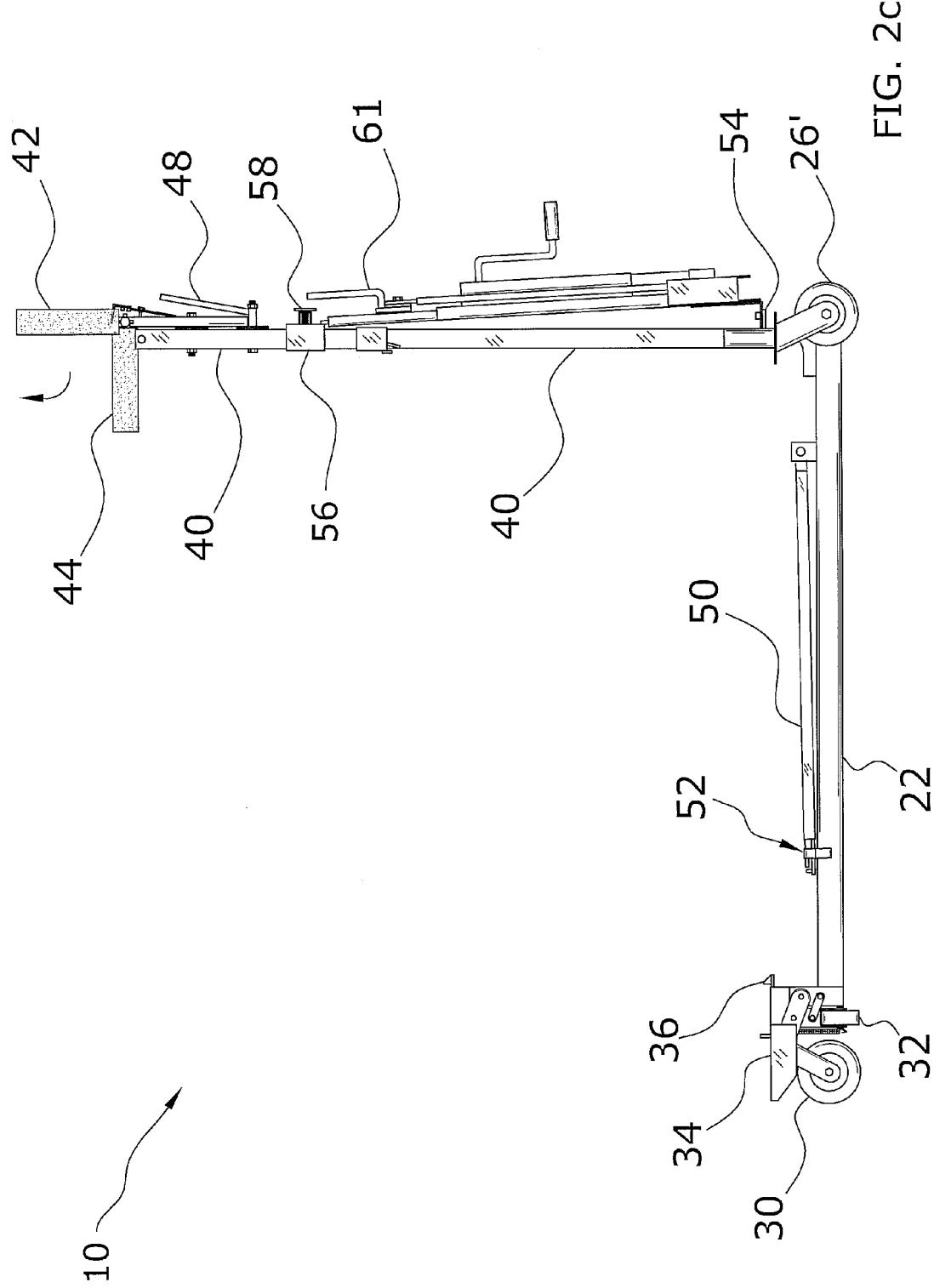
FIG. 2c is a side view of the present invention with the brace member disconnected to allow for folding of the present invention.
Figure 2D:
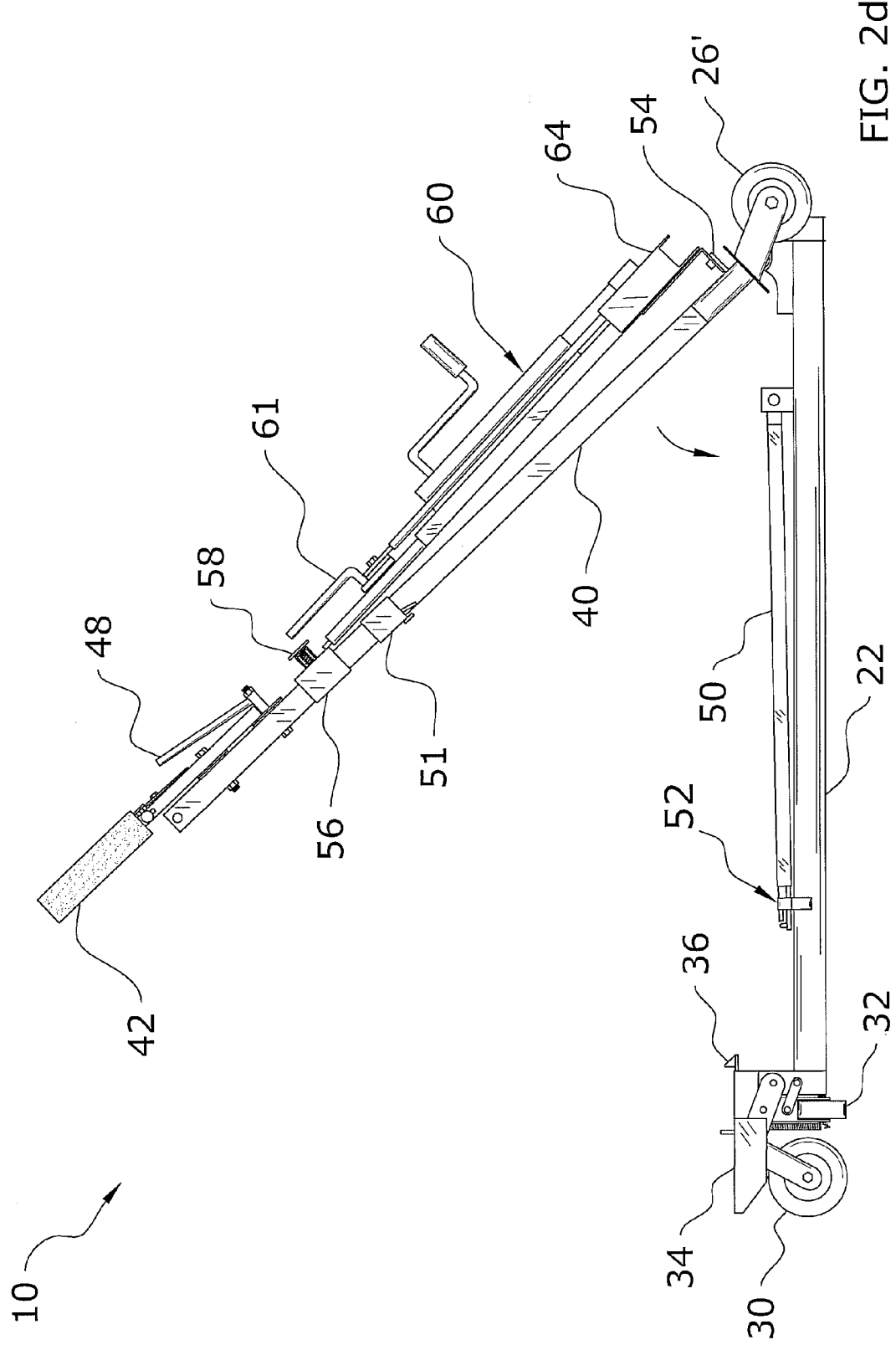
FIG. 2d is a side view illustrating the vertical member being folded towards the base.
Figure 2E:
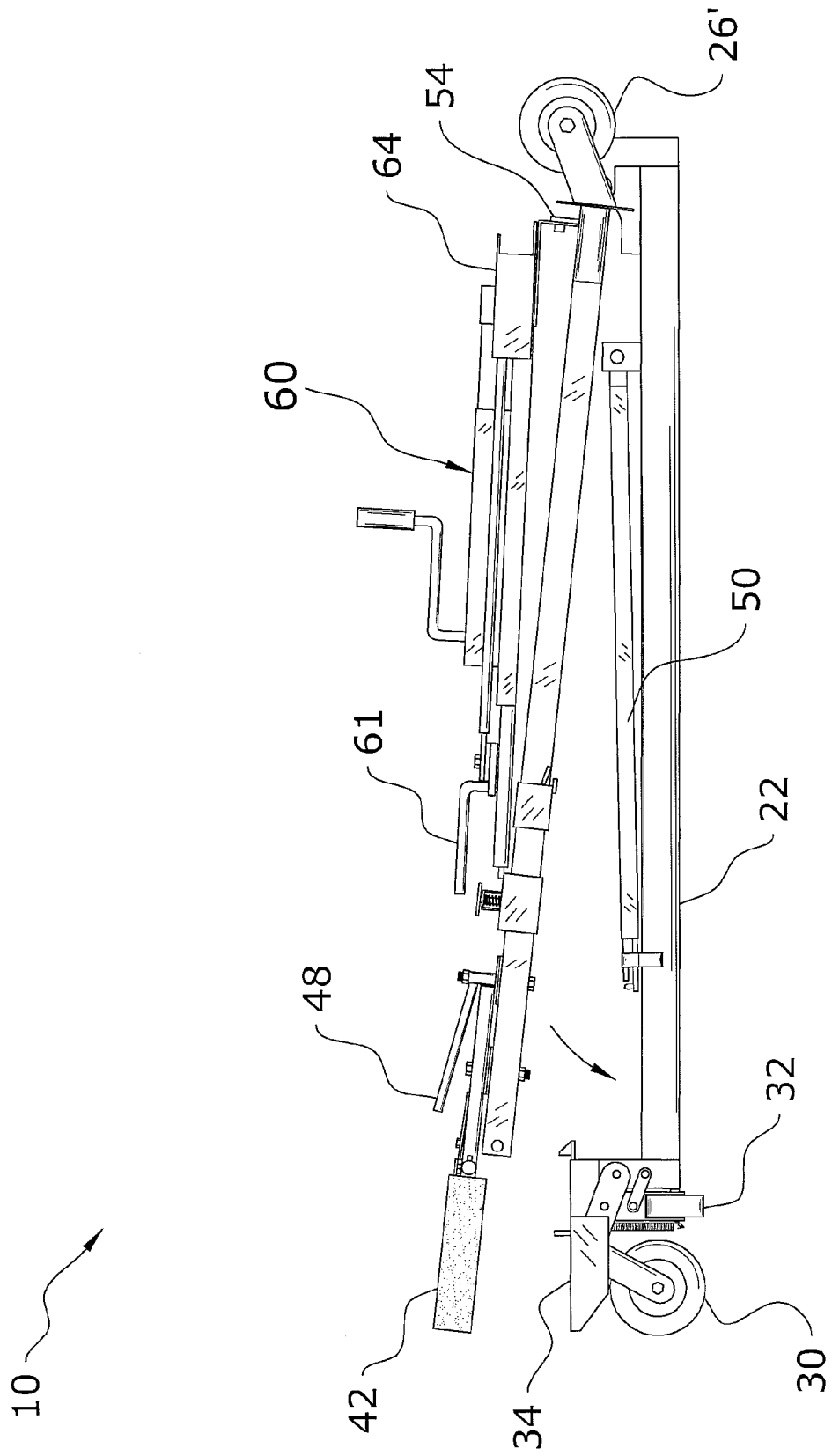
FIG. 2e is a side view illustrating the vertical member being folded closer to the base.
Figure 2F:
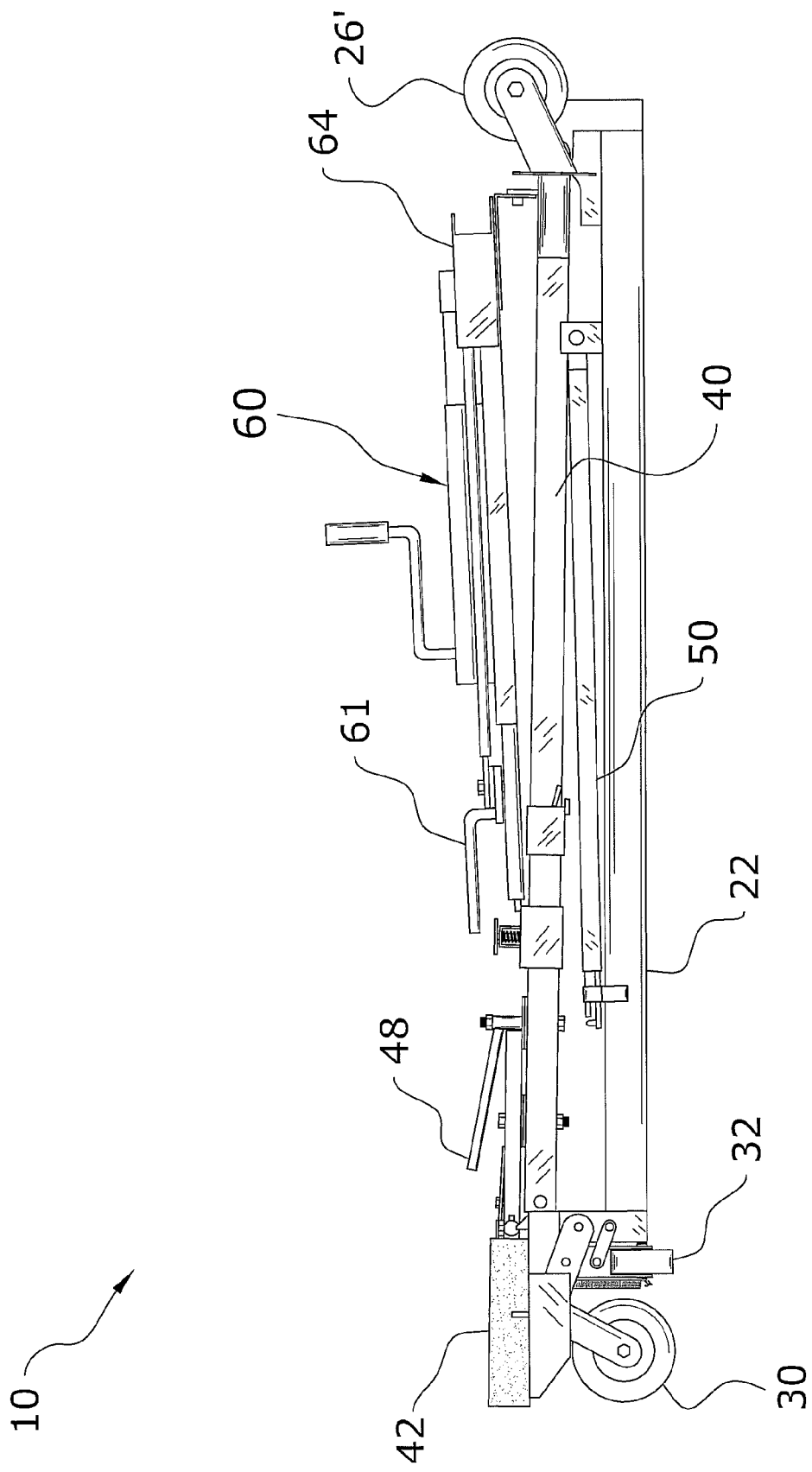
FIG. 2f is a side view illustrating the latch engaging a portion of the guide structure thereby retracting the latch.
Figure 2G:
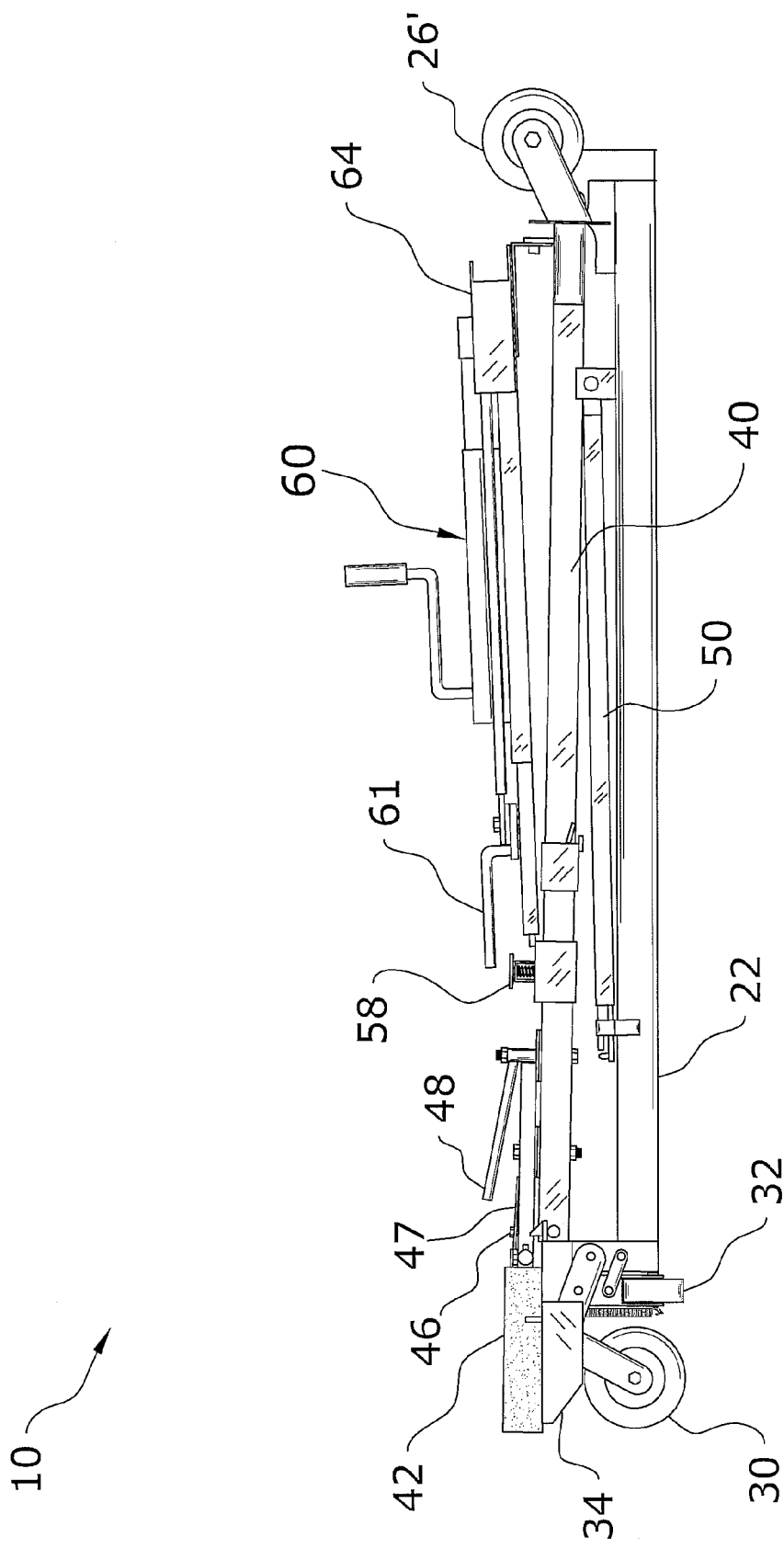
FIG. 2g is a side view illustrating the vertical member folded upon base with the latch extended and engaging the guide structure thereby preventing the vertical member from expanding with respect to the base.
Figure 3A:
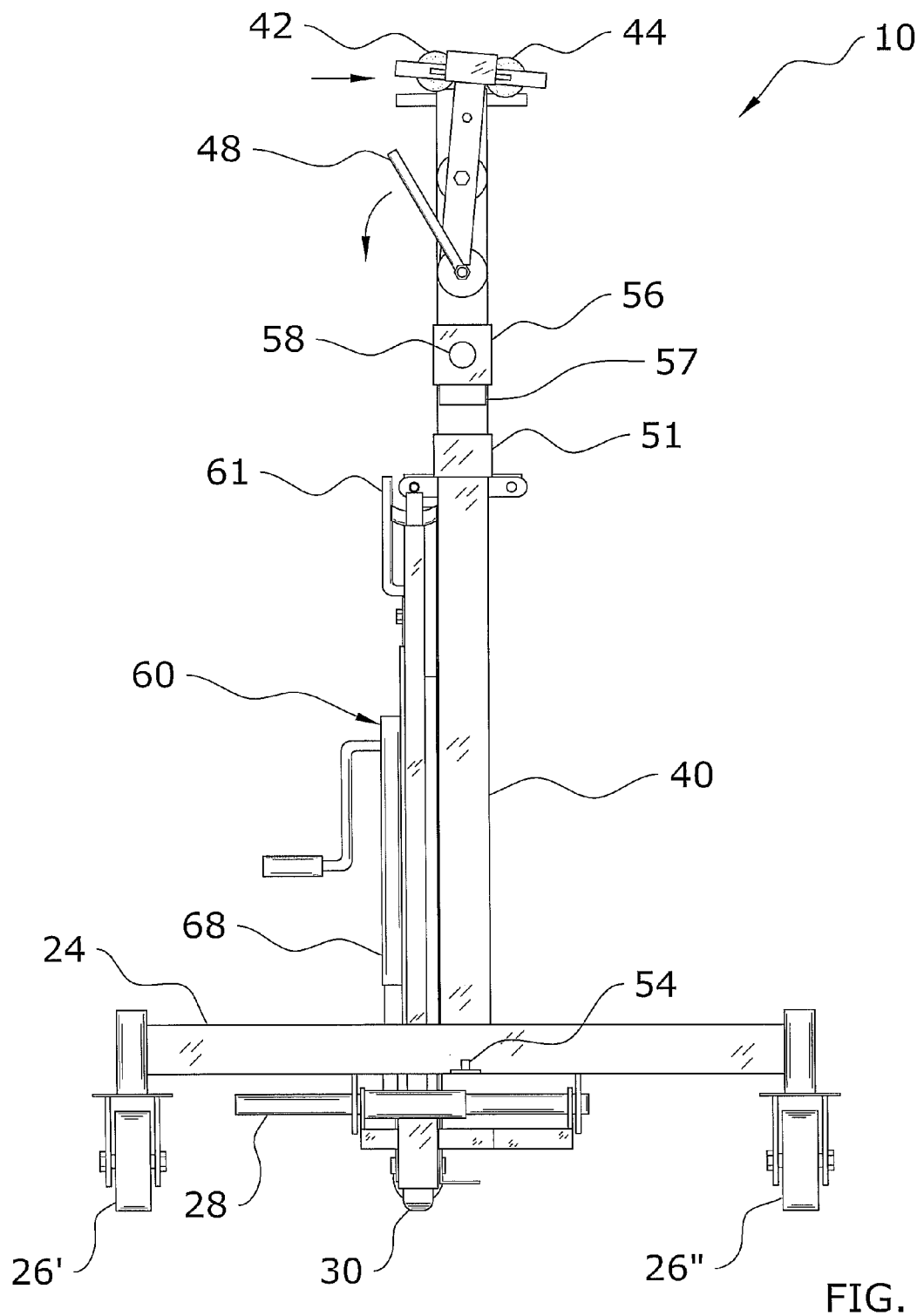
FIG. 3a is a rear end view of the present invention showing the guide structure in a first position.
Figure 3B:
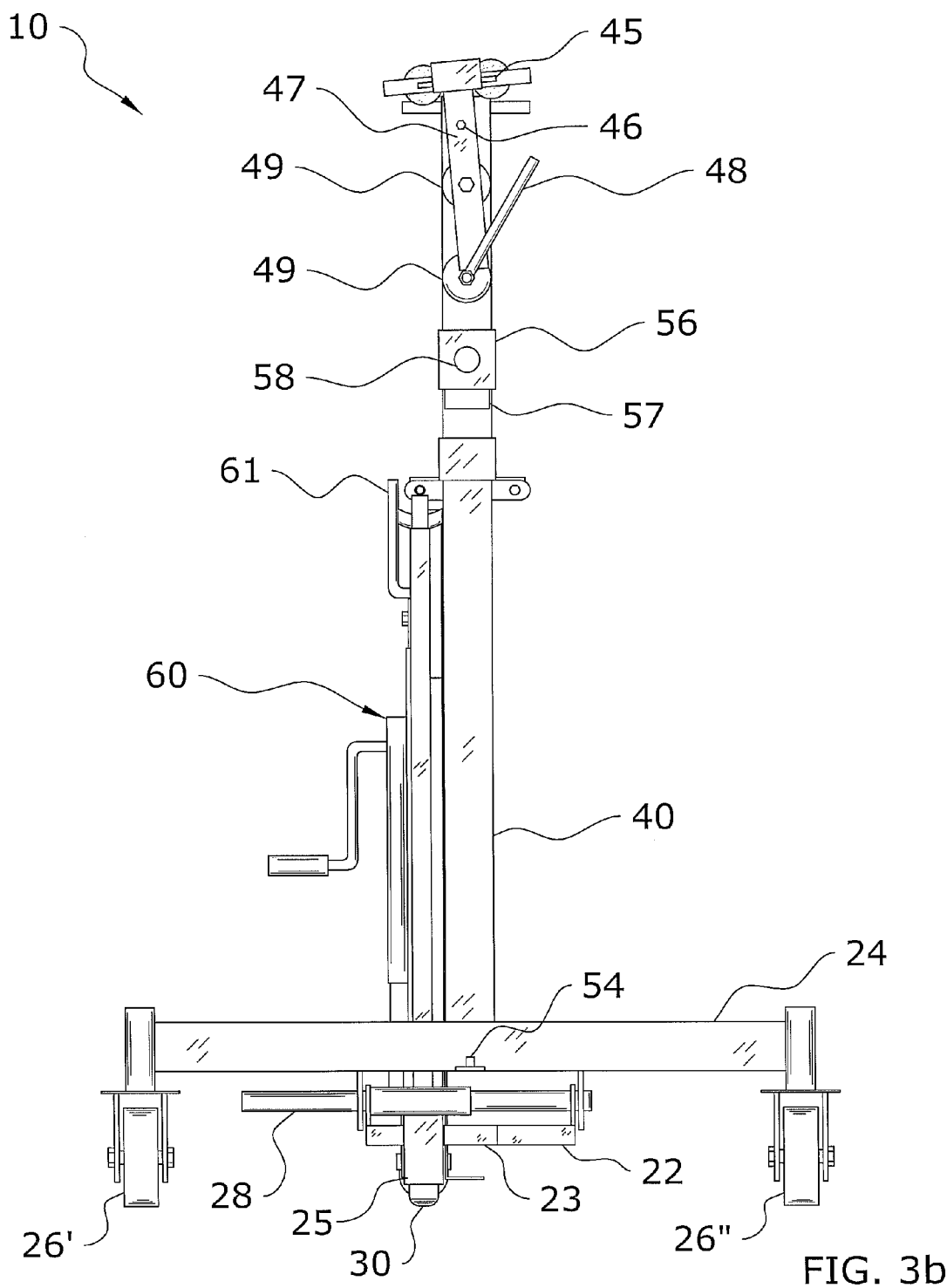
FIG. 3b is a rear end view of the present invention showing the guide structure in a second position.

The base 20 may be non-movably attached to the vertical member 40 forming an L-shaped structure as best illustrated in FIG. 2a of the drawings. However, it is preferable that the base 20 is movably attached to the vertical member 40 to allow for folding of the vertical member 40 with respect to the base 20 member. In particular, it is preferable that the base 20 is pivotally attached to the lower end of the vertical member 40 to allow for folding of the vertical member 40 upon the base 20 in a substantially parallel plane forming a compact storage structure as best illustrated in FIG. 2g of the drawings.

Figure 5A:
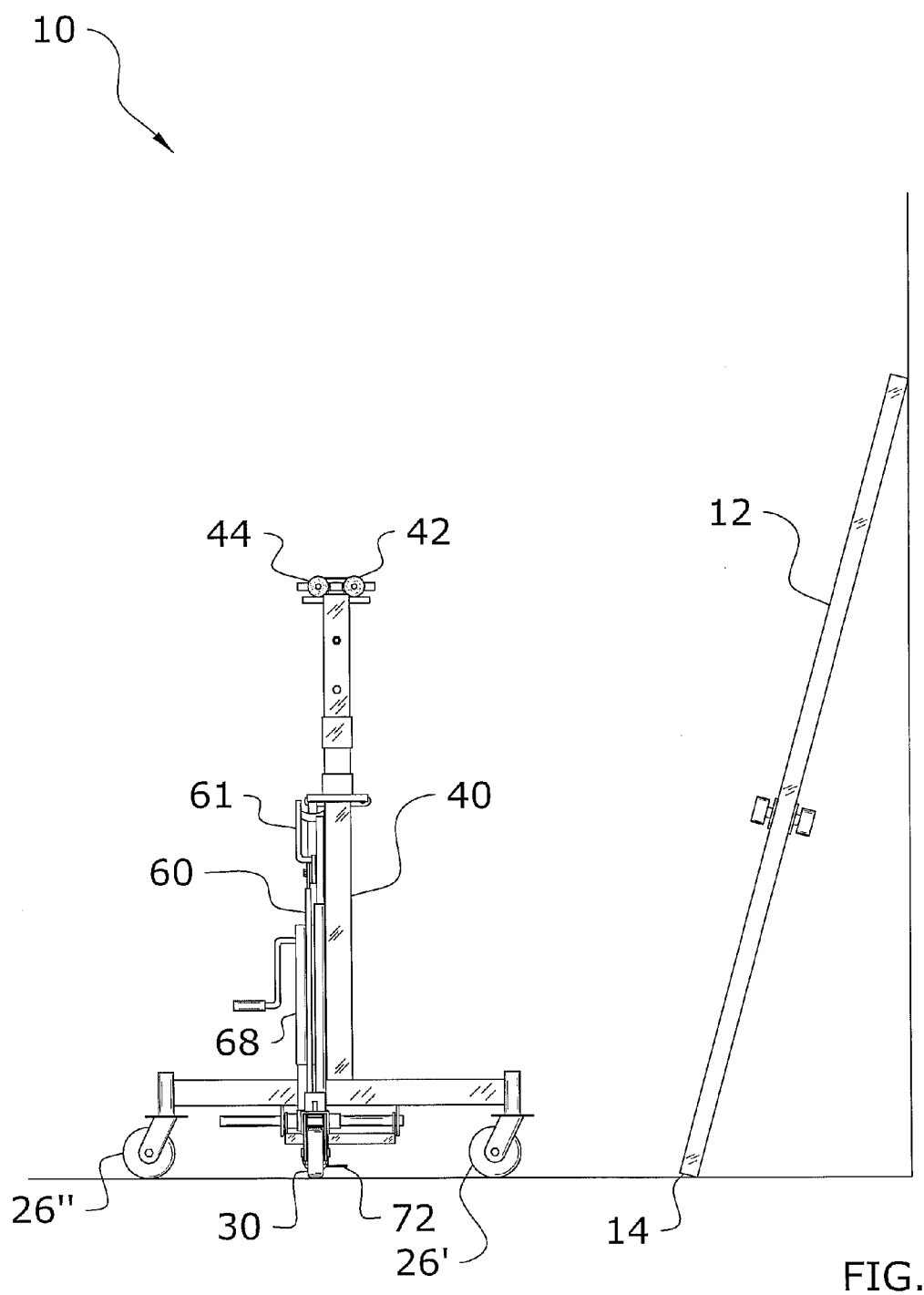
FIG. 5a is a front end view illustrating the present invention approaching a door.
Figure 5B:
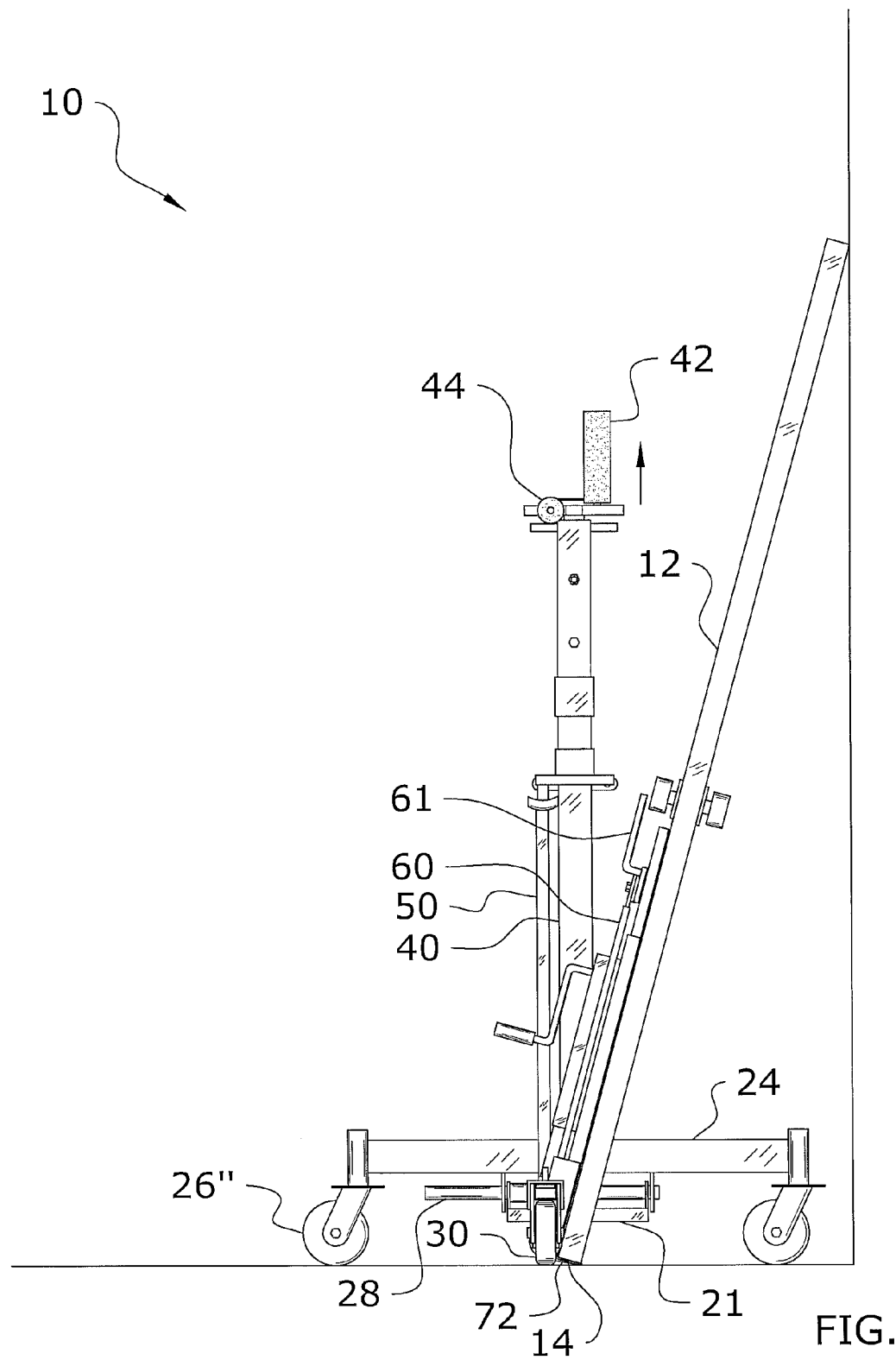
FIG. 5b is a front end view illustrating the carriage engaging the door.
Figure 5C:
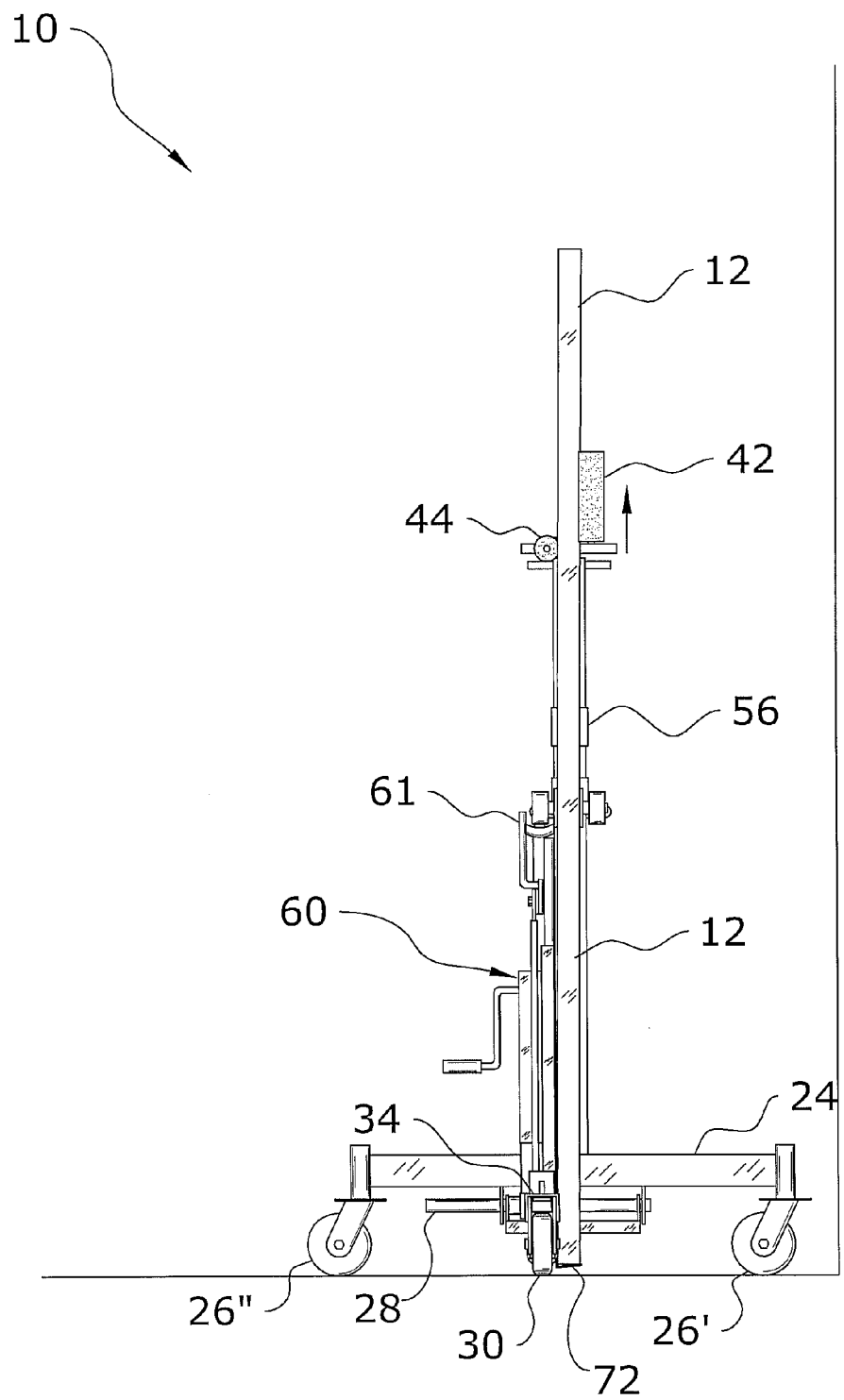
FIG. 5c is a front end view with the door substantially vertically orientated and positioned against the extended guide member.

The base 20 is preferably positioned in an offset position with respect to the longitudinal axis of the vertical member 40 sufficient so that when the carriage 60 supports the door 12 that the door 12 is substantially aligned with the longitudinal axis of the vertical member 40 as best illustrated in FIG. 5c of the drawings. The central location of the door with respect to the vertical member 40 increases stability.

Figure 4A:
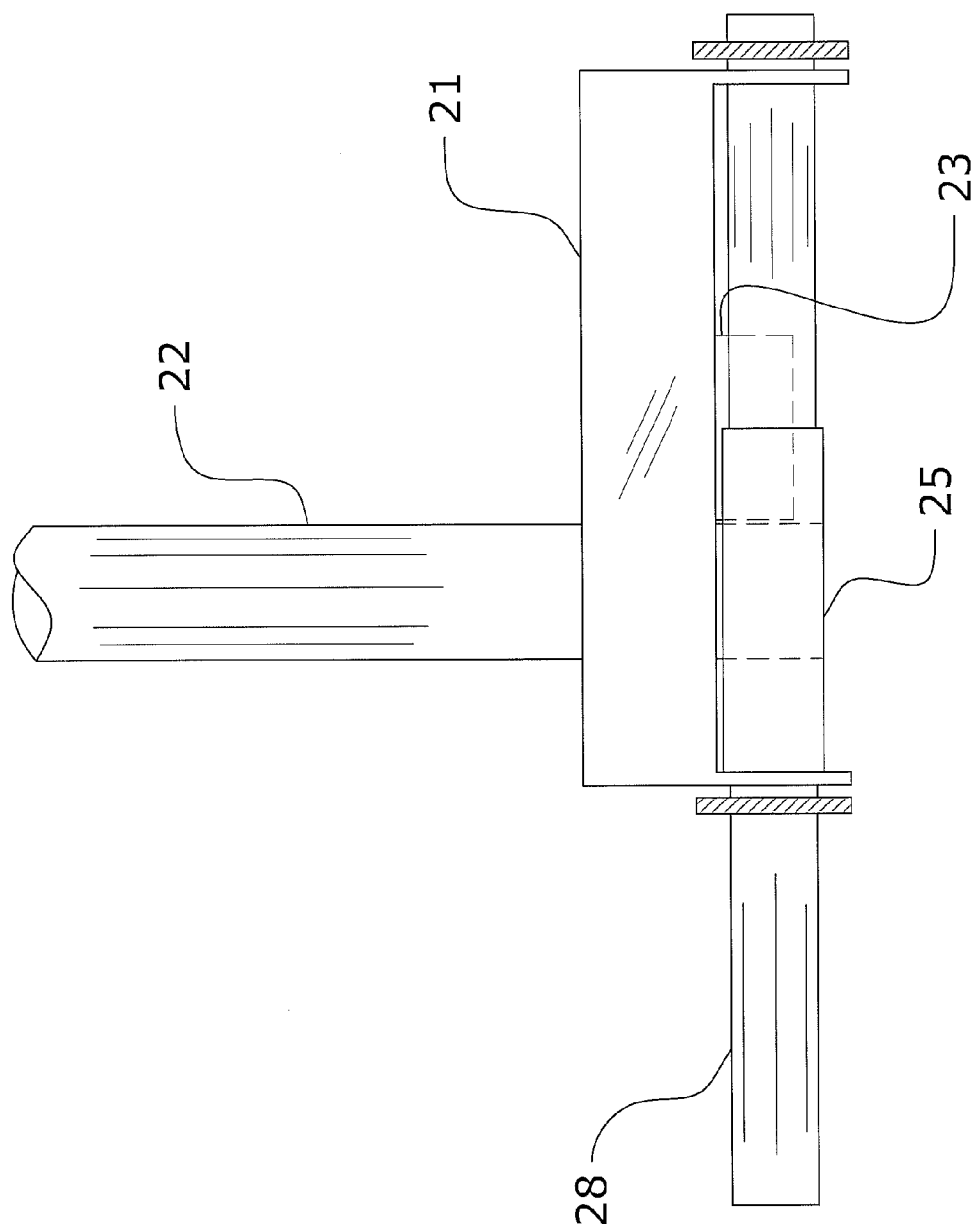
FIG. 4a is a magnified top view of the offset alignment system in a first position.
Figure 4B:
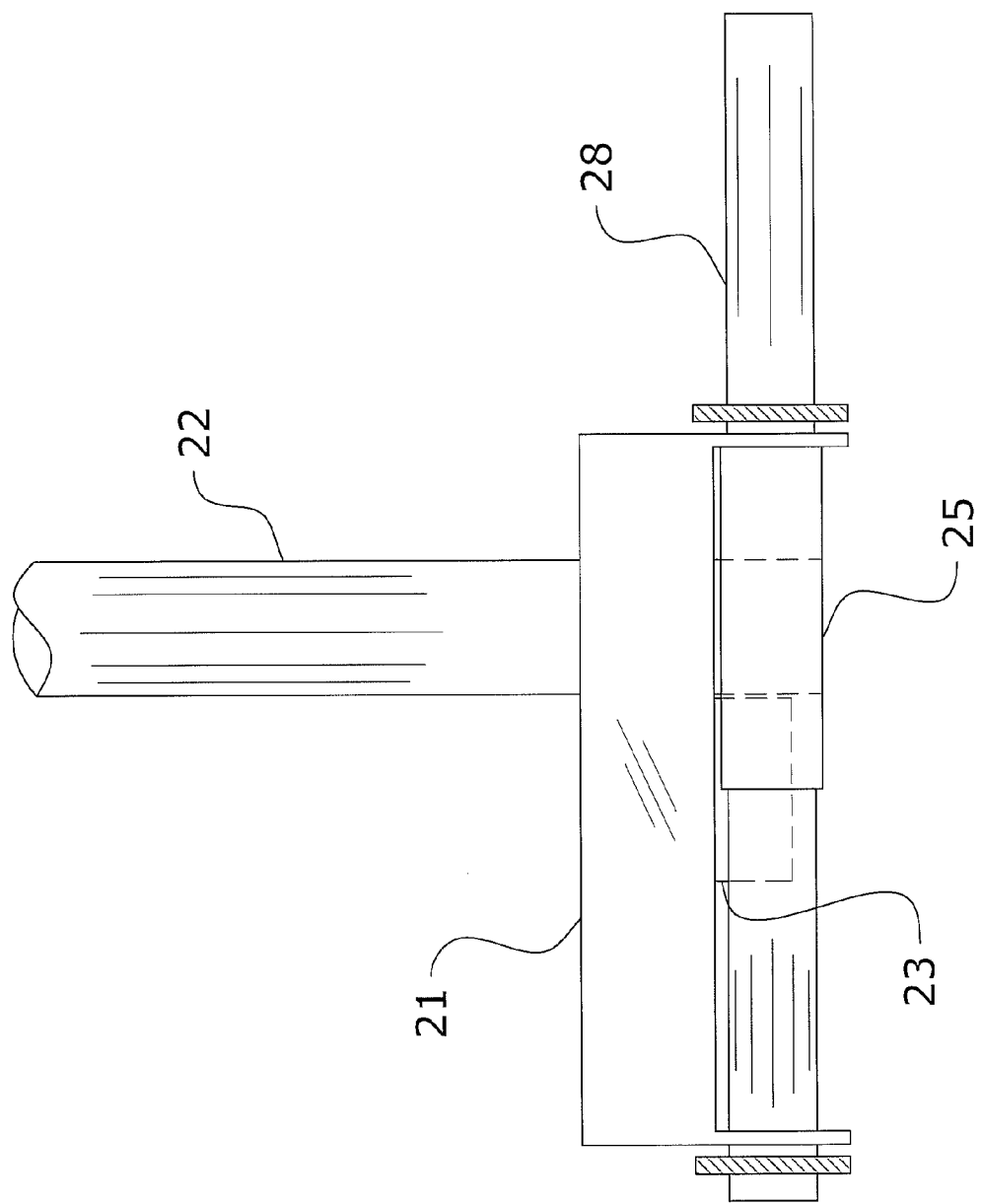
FIG. 4b is a magnified top view of the offset alignment system in a second position.

The base 20 is preferably slidably connected to the vertical member 40 to allow for positioning of the base 20 into a first offset position or a second offset position with respect to the vertical member 40 as illustrated in FIGS. 4a and 4b of the drawings. The first offset position and the second offset position are each offset with respect to a longitudinal axis of the vertical member 40 on opposite sides of the vertical member 40.

A locking device 21 is movably attached to the vertical member 40 and selectively engages the base 20 to maintain the base 20 in either the first offset position or the second offset position as further shown in FIGS. 1a and 1b of the drawings. The locking device 21 preferably pivots about a guide rod 28 that is attached to a vertical portion 25 of the base 20. The guide rod 28 slidably extends through two brackets extending from the cross member 24 as shown in FIG. 1a of the drawings.

The vertical portion 25 extends upwardly from the inner end of the base 20 to allow for pivotal attachment of the base 20 with respect to the vertical member 40 in a distally spaced manner when they are folded together. The locking device 21 includes a tooth 23 that extends inwardly toward and to the side of the vertical portion 25 of the base 20 thereby preventing side-to-side movement of the base 20. When the locking device 21 is pivoted upwardly, the tooth 23 is removed from the side of the vertical portion 25 thereby allowing the base 20 to slide between the first offset position and the second offset position with respect to the vertical member 40.

At the distal end of the base 20, a latch 36 is attached in a biased manner to secure the base 20 to the vertical member 40. The latch 36 selectively catches upon the guide structure 76 when the base 20 is folded with respect to the vertical member 40 as best illustrated in FIGS. 2f and 2g of the drawings. The latch 36 prevents removal of the vertical member 40 and the base 20 from one another unless a user manipulates the latch 36 to release the same.

C. Vertical Member

The vertical member 40 extends upwardly from the inner end of the base 20 as shown in FIGS. 1a and 2a of the drawings. The vertical member 40 is comprised of an elongated structure that preferably extends vertically upward when the present invention is in the expanded position. The vertical member 40 preferably has a length of at least four feet to accommodate doors of significant heights such as ten feet.

A cross member 24 is preferably attached to a lower end of the vertical member 40 as shown in FIG. 1a of the drawings. The cross member 24 provides side-to-side support to the present invention during operation thereof. The cross member 24 is preferably at least three feet in length and the vertical member 40 preferably is attached centrally within the cross member 24 to ensure adequate stability regardless of what position the base 20 is in with respect to the vertical member 40.

D. Carriage

FIGS. 1a, 1b, 1e and 1f illustrate the carriage 60 which is supported by the base 20. The carriage 60 is preferably removably supported upon the base 20 to allow the present invention to fold into a compact storage position. When the carriage 60 is removed from the base 20, the carriage 60 is attached to the side of the vertical member 40 as illustrated in FIG. 2b of the drawings.

Figure 1C:
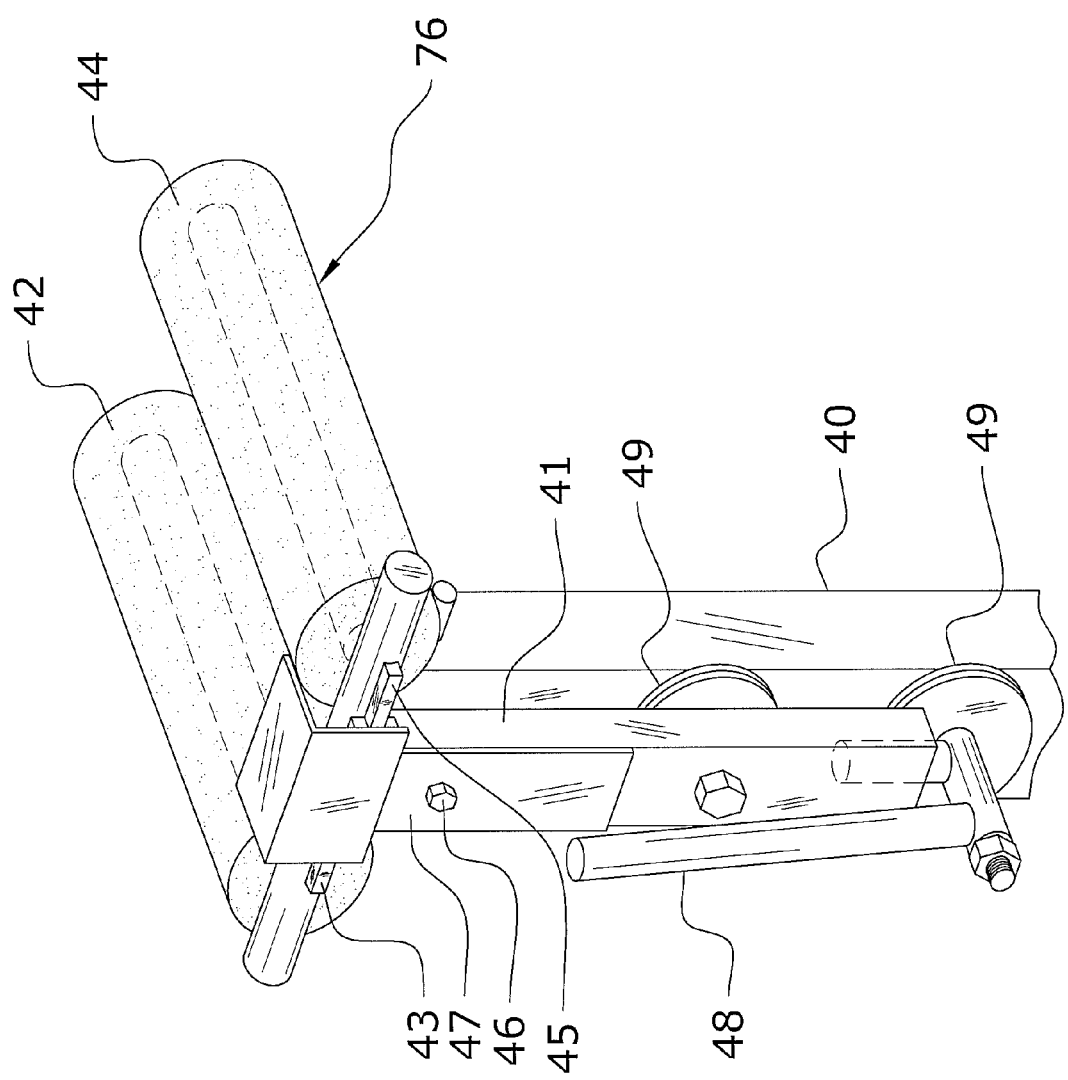
FIG. 1c is a magnified upper perspective view of the guide structure.
Figure 1D:
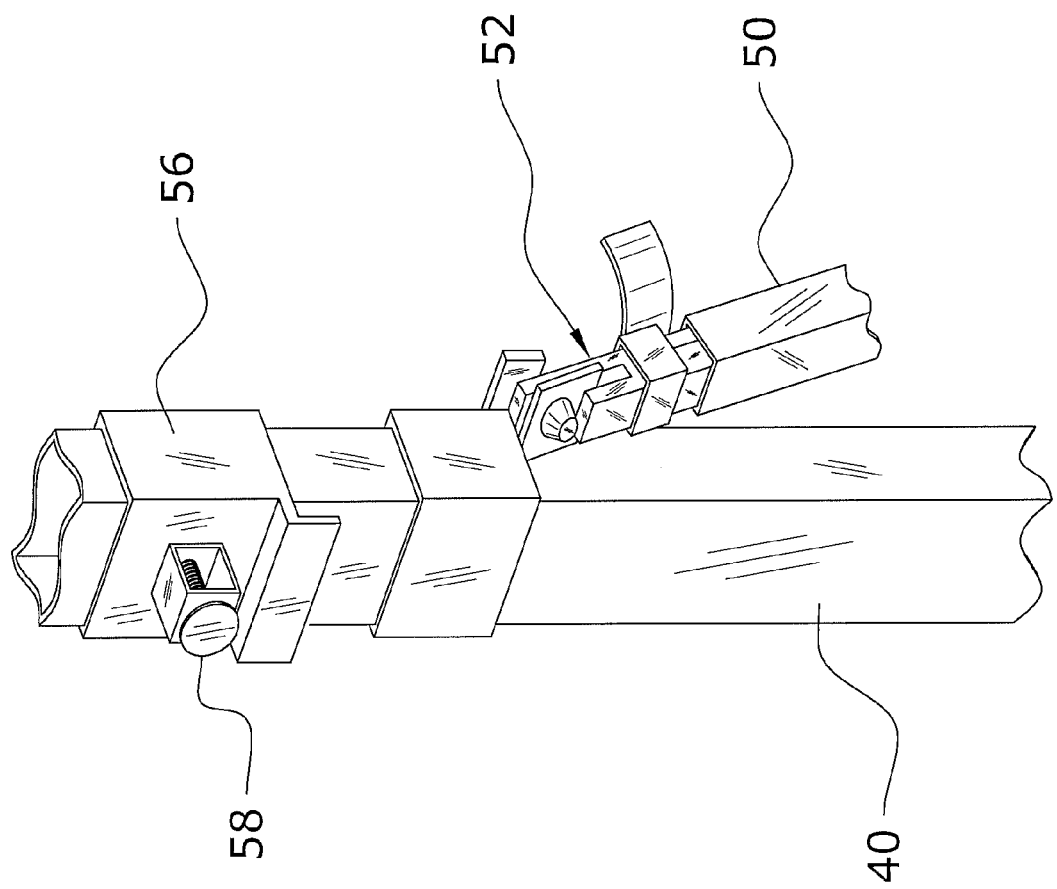
FIG. 1d is a magnified upper perspective view of the sliding member positioned upon the vertical member.
Figure 1E:
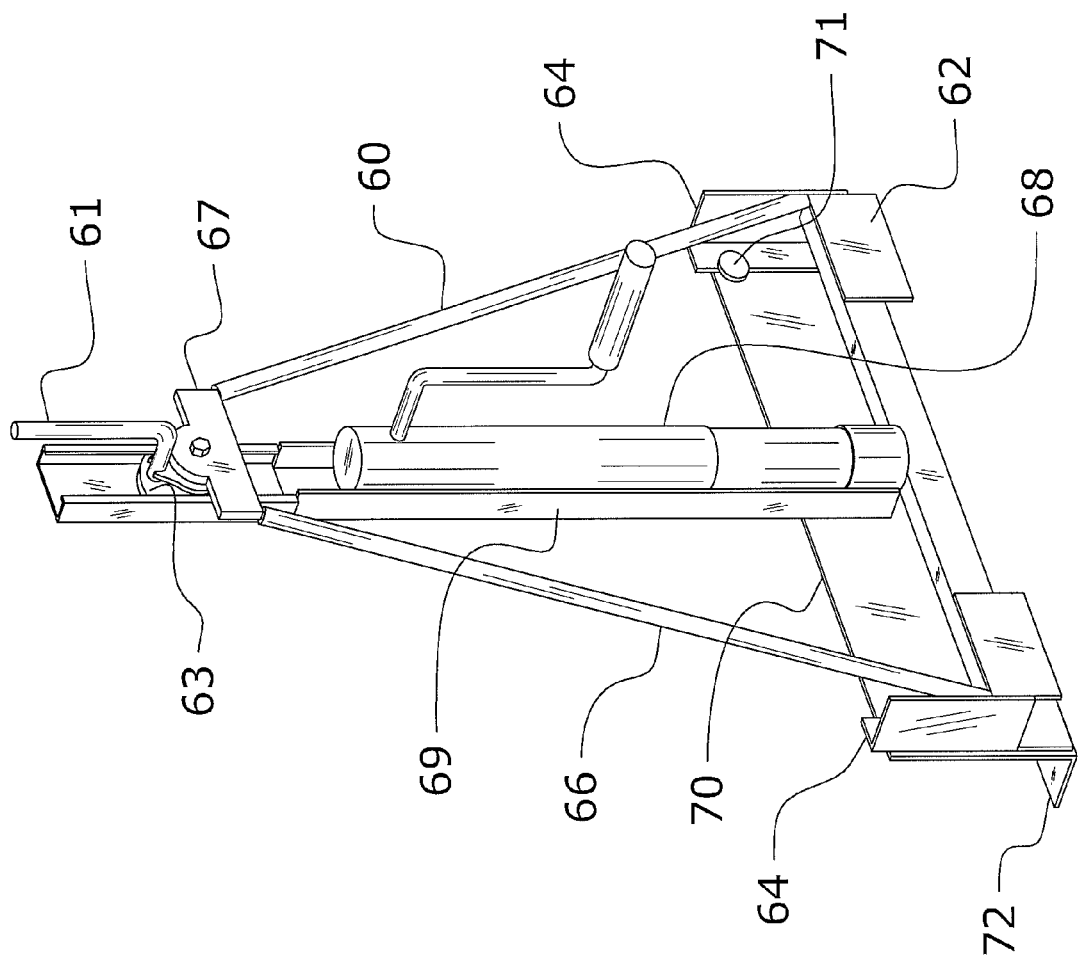
FIG. 1e is a rear upper perspective view of the carriage.
Figure 1F:
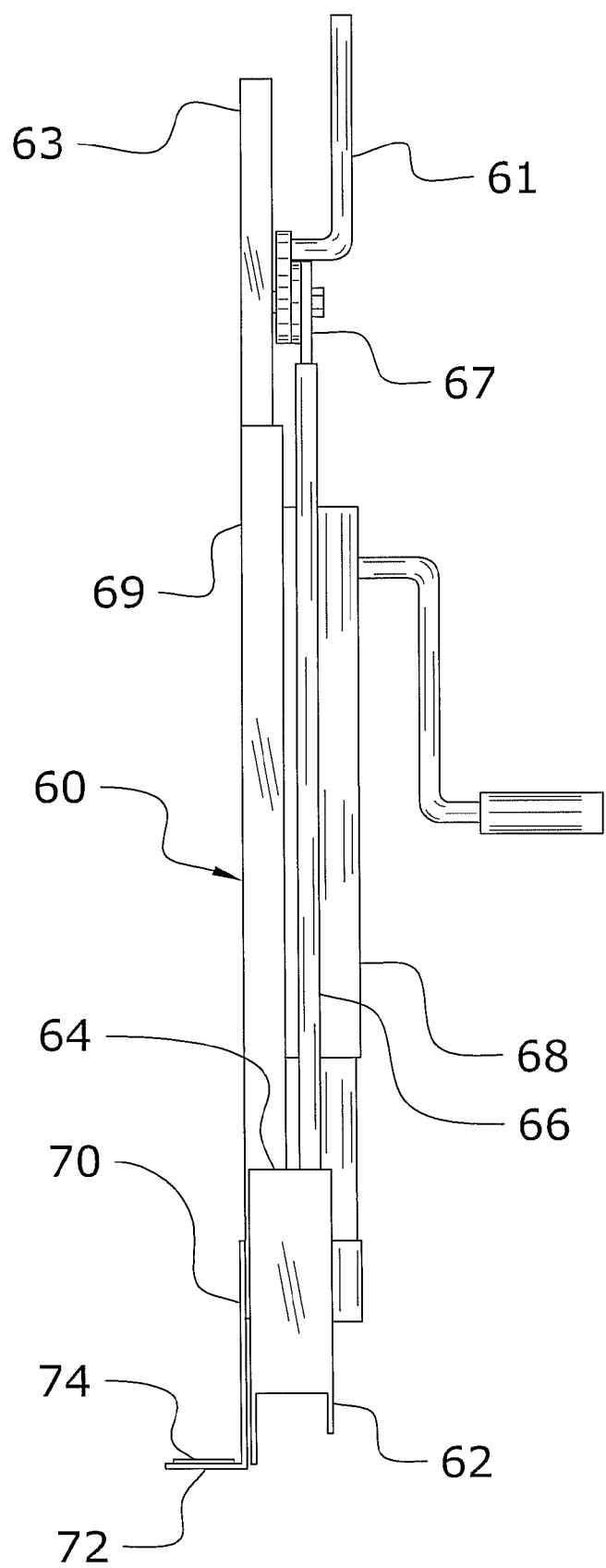
FIG. 1f is a side view of the carriage.

The carriage 60 is comprised of a lower receiver 62 that receives the base 20 as illustrated in FIGS. 1e and 1f of the drawings. The lower receiver 62 preferably forms a channel that slidably receives the upper part of the base 20 as best illustrated in FIG. 1 of the drawings. The channel may be comprised of various cross sectional shapes that allow for pivoting about the surface of the base 20. The pivoting of the carriage 60 upon the base 20 allows for adjustment of the pitch angle of the door 12.

The lower receiver 62 is further preferably slidably positionable upon the base 20 to allow for adjustment of the carriage 60 to a central location of the door 12 for doors 12 of various widths. The sliding of the lower receiver 62 ensures that the door 12 is properly positioned with respect to the guide structure 76.

The lower receiver 62 includes guide portions 64 that extend inwardly to slidably receive the lifting member 70. A support bar extends between the opposing sides of the lower receiver 62 to provide support and to connect the actuator 68 to.

The lifting member 70 is comprised of a broad structure and includes a lip member 72 extending outwardly to engage the bottom edge 14 of the door 12 as best illustrated in FIG. 1f of the drawings. The lip member 72 preferably includes a gripping material 74 to prevent movement of the door 12 when positioned upon the lip member 72. The lip member 72 preferably extends along the entire length of the lifting member 70 to provide increased support to the door 12. A pair of ear members 71 are attached to the rear surface of the lifting member 70 and extend along the backside of the guide portions 64 to form a sliding slot to guide the lifting member 70 along the guide portions 64. The lifting member 70 moves upwardly and downwardly base 20d upon the lifting force applied by the actuator 68.

A pair of support arms 66 extend from the lower receiver 62 and extend upwardly as shown in FIGS. 1a and 1e of the drawings. The support arms 66 are attached to an upper member 67 forming a triangular shape.

A cam 63 is pivotally attached to the upper member 67 and a roll lever 61 is attached to the cam 63 to manipulate the cam 63. The cam 63 is comprised of an uneven shaped structure that moves the connecting member 69 when rotated.

Figure 6A:
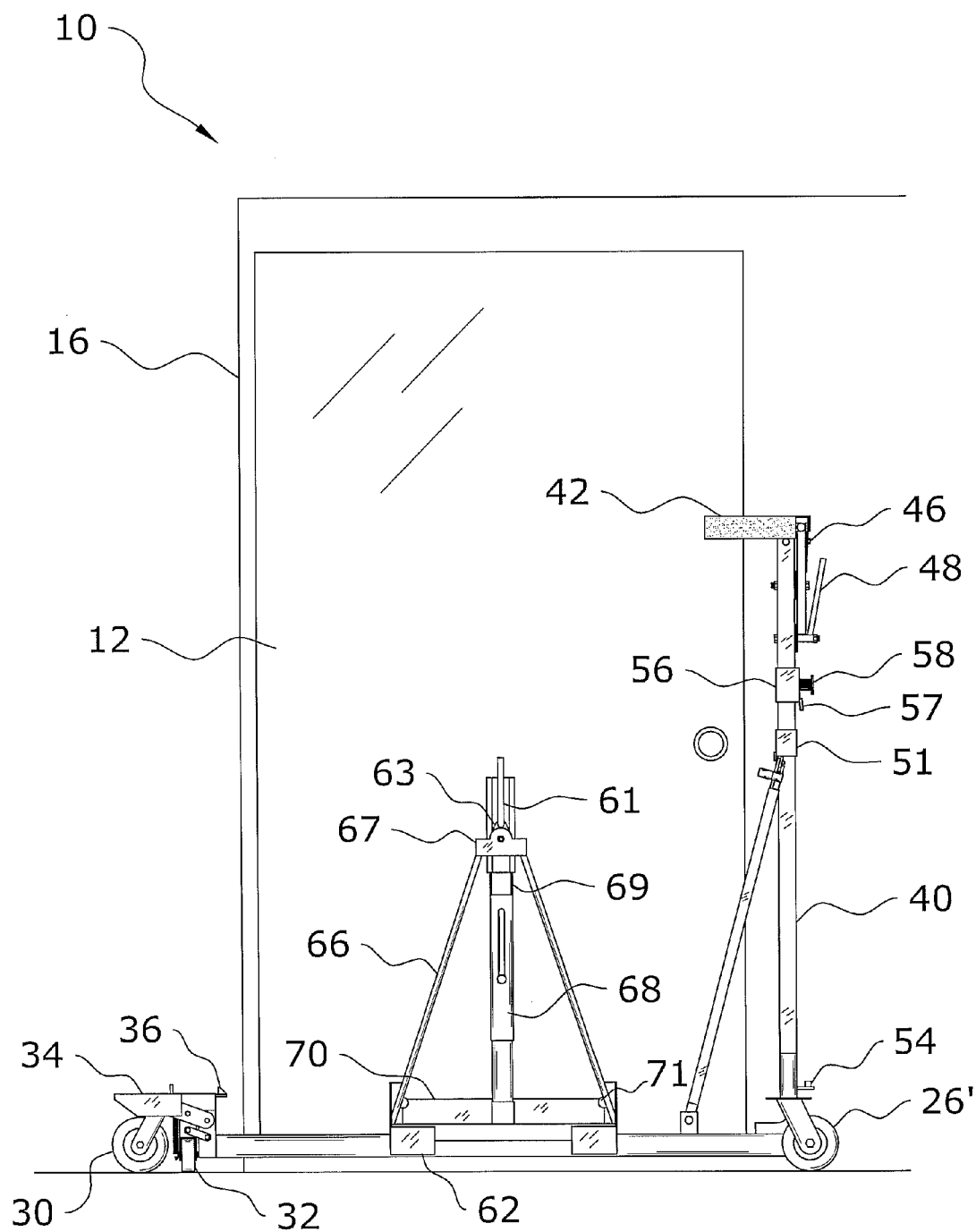
FIG. 6a is a side view of the present invention support a door.
Figure 6B:
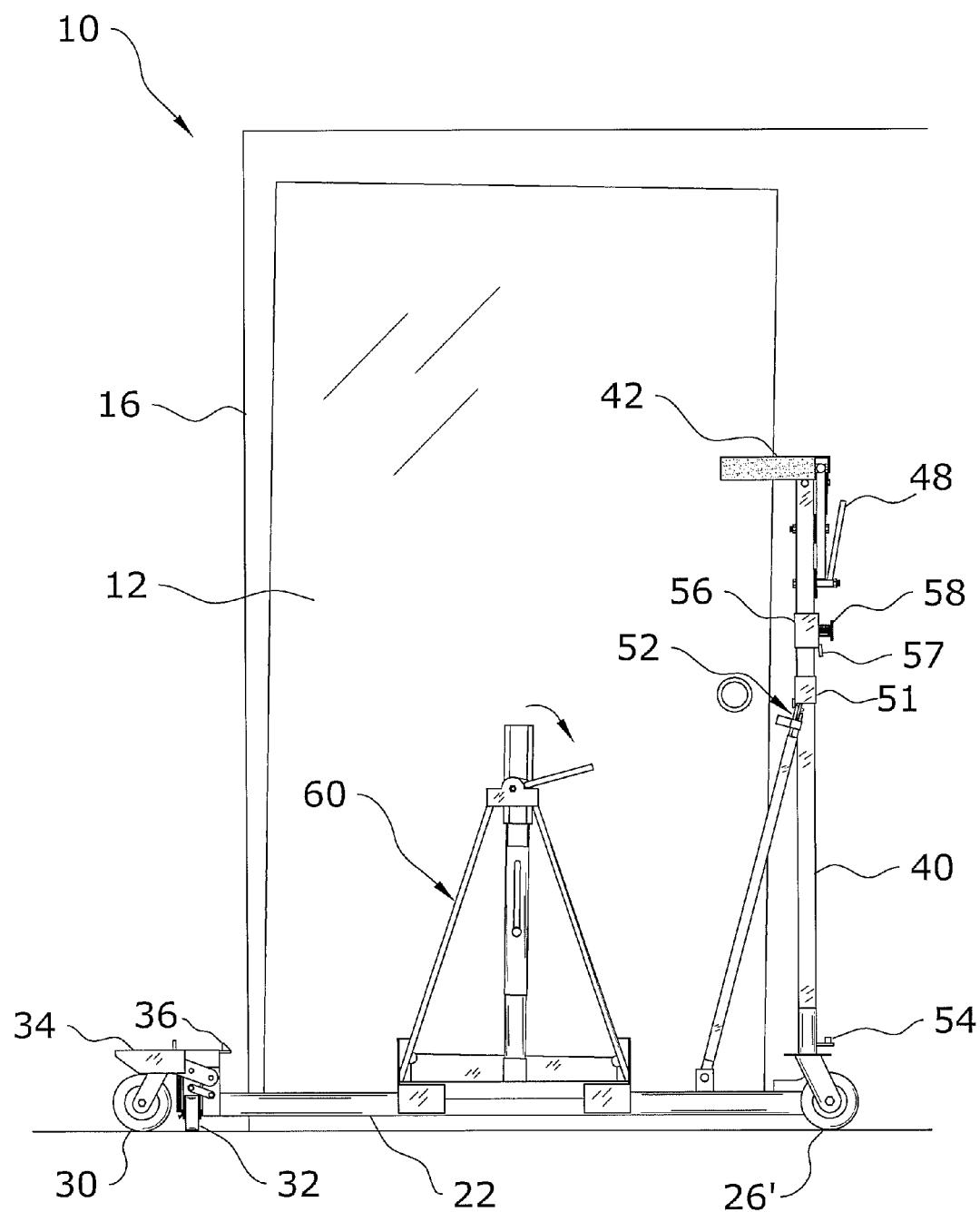
FIG. 6b is a side view of the present invention with the roller lever manipulated resulting in a change in the roll of the door.
Figure 6C:
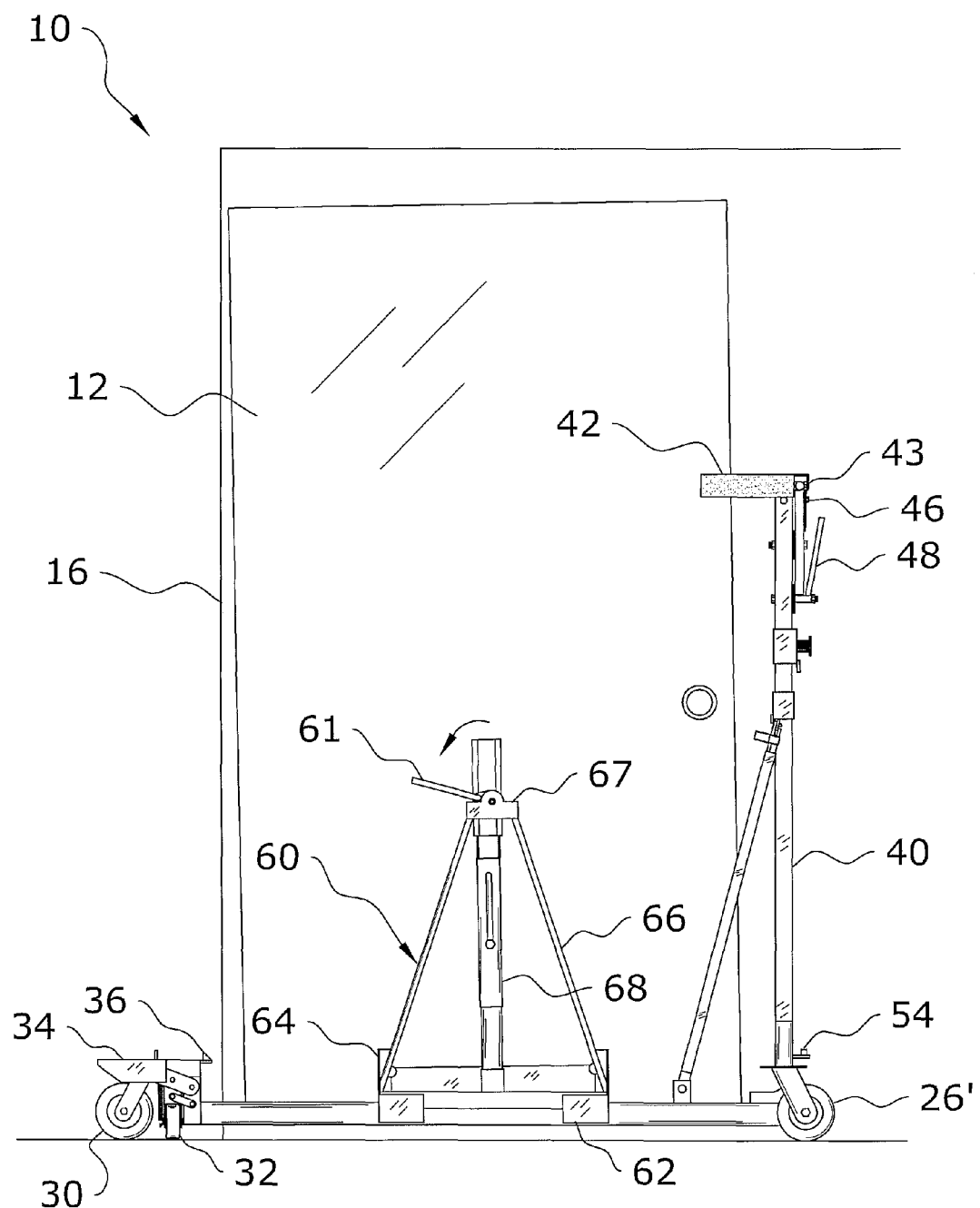
FIG. 6c is a side view illustrating the roller lever manipulated to an opposite side to modify the roller of the door.
Figure 6D:
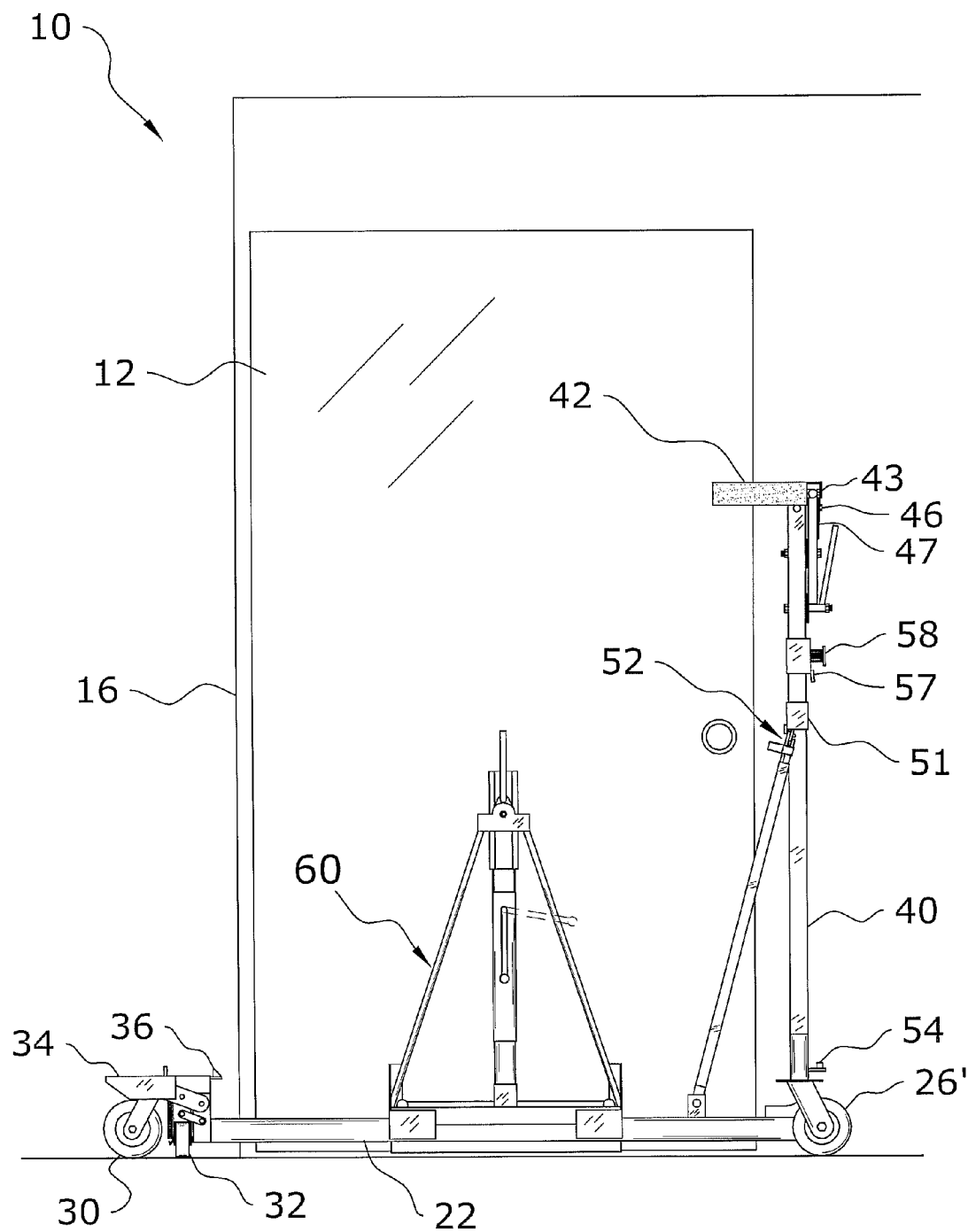
FIG. 6d is a side view illustrating the door being lowered on the carriage.
Figure 6E:
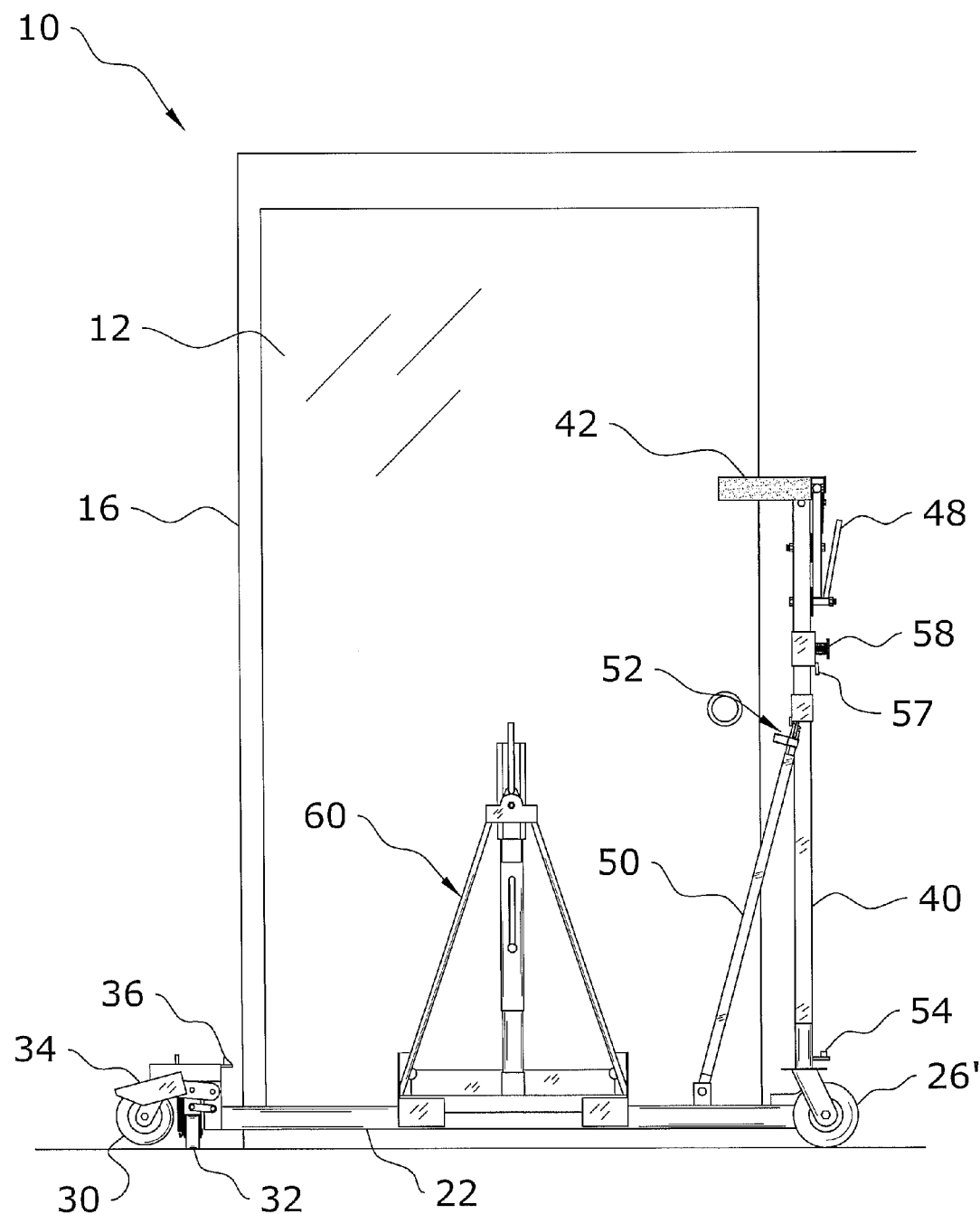
FIG. 6e is a side view illustrating the foot lever depressed thereby allowing the secondary wheel to engage the floor to rotate the door closer to the door jamb.

The connecting member 69 is attached in a vertical manner to the lifting member 70 and to the actuator 68 as shown in FIG. 1e of the drawings. The upper portion of the connecting member 69 preferably includes a channel that receives the cam 63 so that when the cam 63 is rotated the connecting member 69 is moved from left to right or vice-versa to allow for adjustment of the roll angle of the door as shown in FIGS. 6a through 6c of the drawings. As the cam 63 is rotated within the connecting member 69, the connecting member 69 and the lifting member 70 have their roll angle adjusted accordingly and slide/adjust within the lower receiver 62 as shown in the figures.

The actuator 68 may be comprised of a hand operated device or powered device to cause the lifting/lowering of the lifting member 70. The actuator 68 is attached at its upper end to the connecting member 69 and the lower end to the support bar of the lower receiver 62. The actuator 68 allows for adjustment of the door height in use.

FIG. 2a illustrates the carriage 60 removably attached to the vertical member 40 in a storage position. A lower support 54 extends outwardly from the vertical member 40 and has an extended portion that extends upwardly. An aperture within the lip member 72 is positioned around the extended portion with the upper end of the connecting member 69 received within a jaw 57 of a sliding upper support 56 wherein an upper locking member 58 is biased and extends into an opening within the vertical member for selectively locking the upper support 56 in a lowered or raised position. FIG. 2a illustrates the upper support 56 in a lowered position thereby retaining the carriage 60 in the storage position. FIG. 2c illustrates the upper support 56 in the raised position thereby allowing the carriage 60 to be removed from the vertical member 40.

E. Guide Structure

The guide structure 76 attached to an upper portion of the vertical member 40 as best illustrated in FIGS. 1a and 1c of the drawings. The guide structure 76 is designed for guiding an upper portion of the door positioned upon the carriage 60 as illustrated in FIGS. 6a through 6e of the drawings.

The guide structure 76 is preferably movable from left to right thereby manipulating a pitch angle of the door. The guide structure 76 is preferably comprised of a first guide member 42 and a second guide member 44 forming a receiver slot between thereof. The first guide member 42 and the second guide member 44 are preferably comprised of a rigid member surrounded by a padding material to protect the door. (e.g. foam rubber).

Figure 5D:
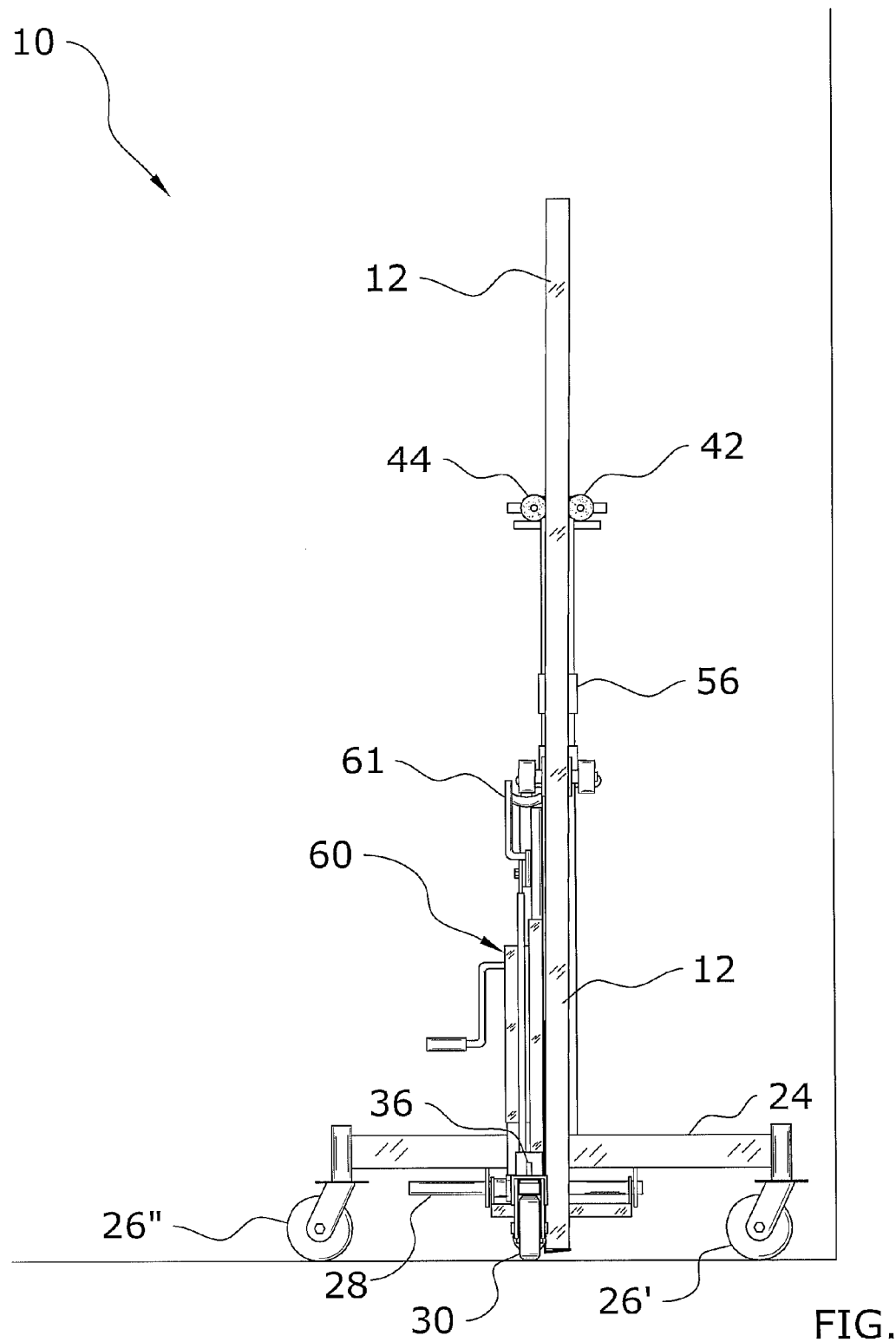
FIG. 5d is a front end view with the other guide member extended to engage the other side of the door thereby preventing significant movement of the door and maintaining the door in a substantially centered position.
Figure 5E:
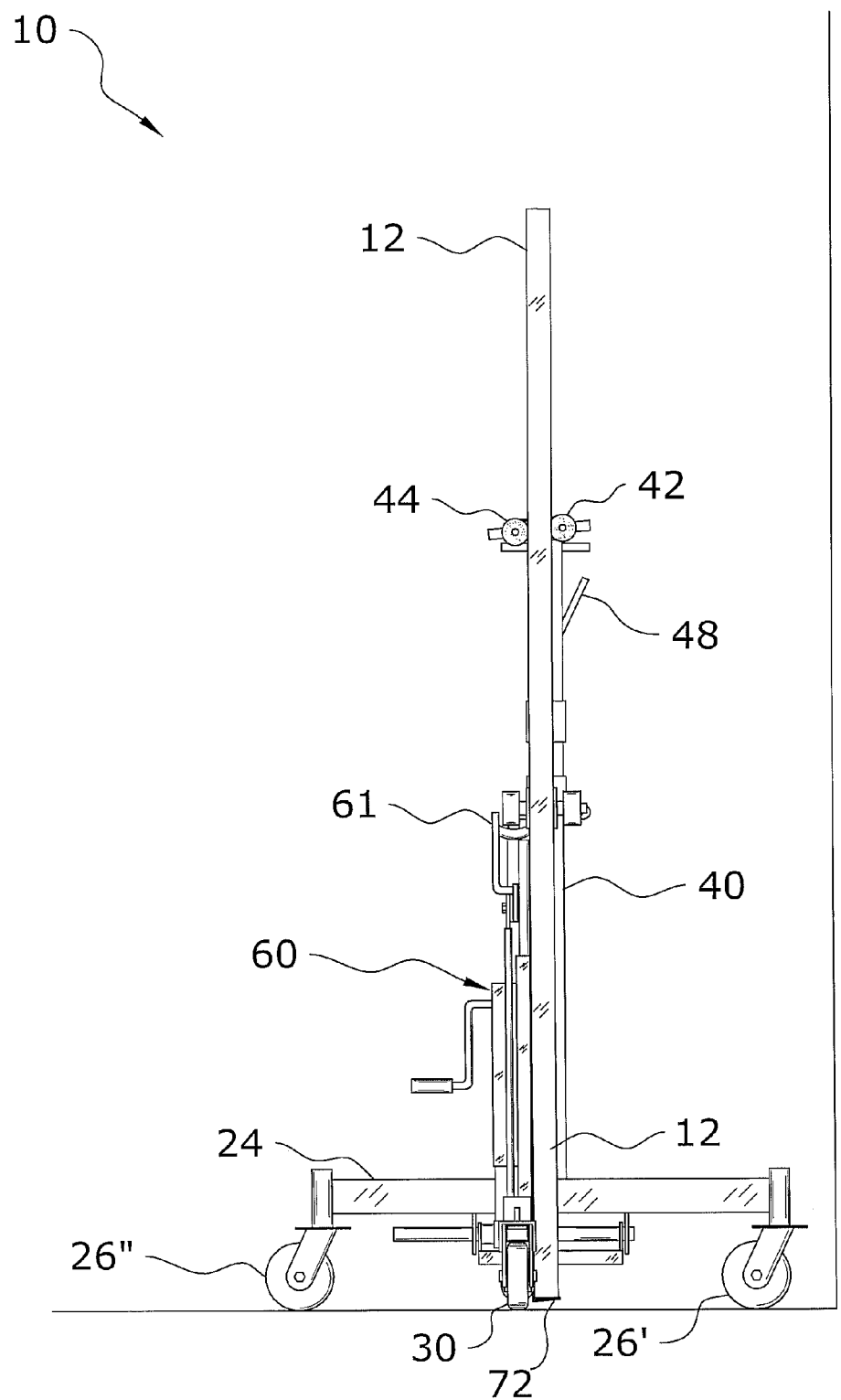
FIG. 5e is a front end view of the door positioned within the present invention and the guide structure modifying the pitch of the door.

The first guide member 42 and the second guide member 44 extend substantially parallel with respect to one another and with respect to the base 20. The first guide member 42 and the second guide member 44 are preferably pivotally attached to the vertical member 40 to allow for positioning of the door 12 between the guide members. As shown in FIG. 5c of the drawings, the door 12 is positioned against one of the guide members first when the other guide member is pivoted upwardly and then the remaining guide member is lowered to secure the door 12 between the guide members in a secure position and with limited movement as shown in FIG. 5d of the drawings.

As shown in FIG. 1c of the drawings, an arm member 41 is pivotally attached to the vertical member 40 and supports the guide members upon a horizontal post. The guide members pivot about the horizontal post. A locking lever 47 is pivotally attached to the arm member 41 in a biased manner by the biasing member 46 and allows for locking of the guide member in the horizontal position as shown in FIG. 1c of the drawings. A lower lip extends from the inner portion of the locking lever 47 that is positioned below a first locking member 43 on the first guide member 42 and a second locking member 45 on the second guide member 44 to prevent rotation of the guide members upwardly when the locking lever 47 is in a normal state but allows rotation of the guide members when released.

A handle 48 is rotatably attached to the vertical member 40 along with a friction member 49 to reduce movement of the handle 48. The handle 48 has an extended portion that extends upwardly into an open lower end of the arm member 41 thereby causing rotation of the arm member 41 when the handle 48 is rotated.

F. Brace Member

A brace member 50 having a first end and a second end is preferably attached between the base 20 and the vertical member 40. The first end is preferably pivotally connected to the base 20 and the second end is connected to the vertical member 40 in either a pivotal manner or removable manner. The second end of the brace member 50 is preferably attached to a bracket extending from the vertical member by an attachment device 52 (e.g. using a pin from the second end extending through an opening in the bracket along with a sliding collar that prevents the pin from being removed).

Figure 7A:
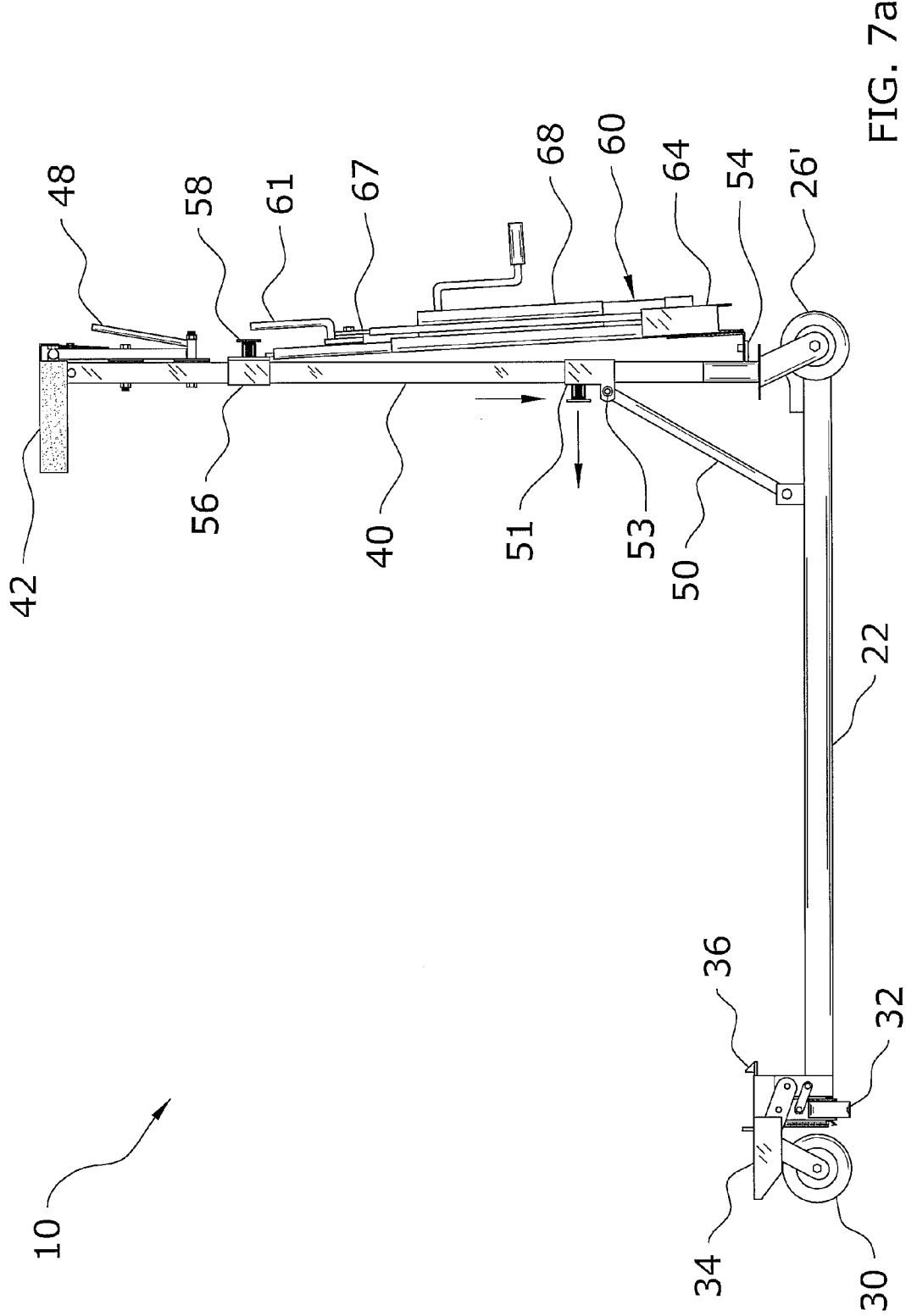
FIG. 7a is a side view of an alternative embodiment where the base member is attached to a sliding member.
Figure 7B:
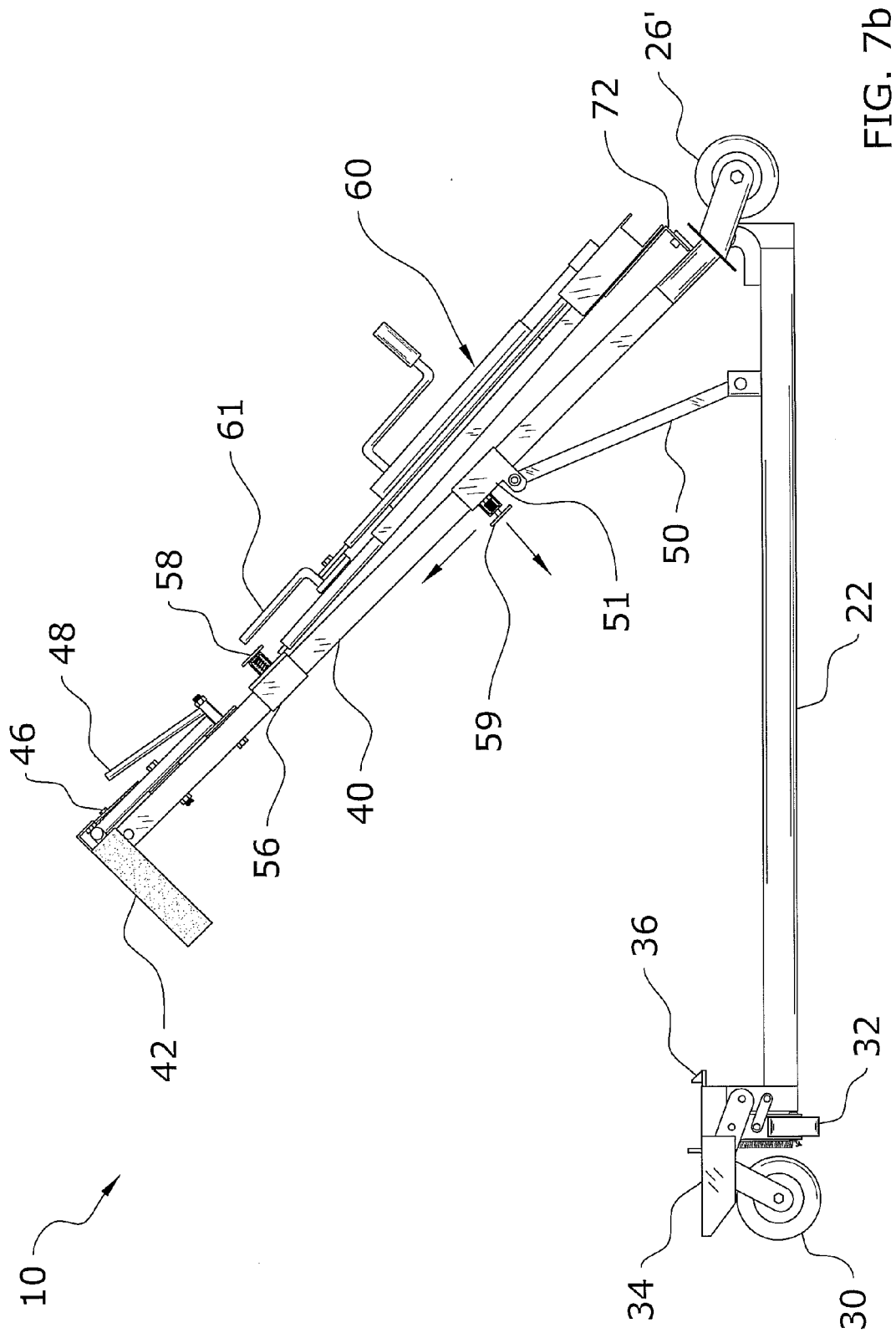
FIG. 7b is a side view of the alternative embodiment illustrating the vertical member folding towards the base member with the sliding member sliding along the vertical member.
Figure 7C:
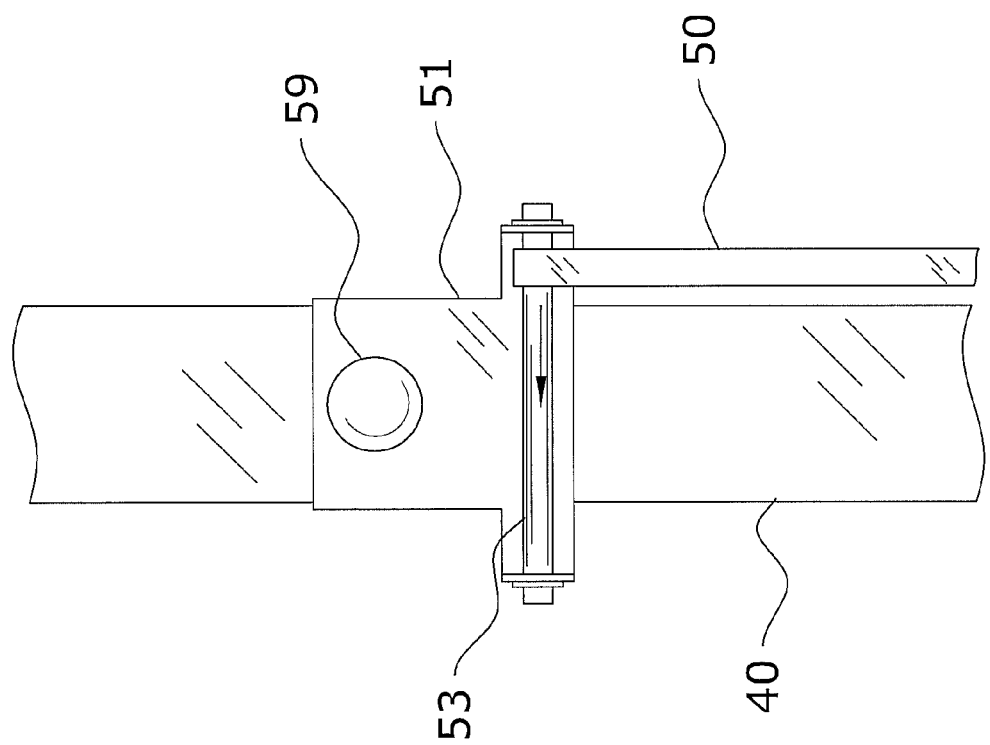
FIG. 7c is a magnified front view of the alternative embodiment.

It is preferably that the second end of the brace member 50 is pivotally attached to the vertical member 40 to allow for folding of the vertical member 40 with respect to the base 20 without having to remove the brace as illustrated in FIGS. 7a through 7c. A sliding member 51 is preferably slidably positioned about the vertical member 40 and a pin member 53 extends substantially horizontally from the sliding member 51 as shown in FIG. 7c of the drawings. The second end of the brace member 50 is pivotally and slidably attached to the pin member 53 thereby allowing adjustment of the base 20 with respect to the vertical member 40 for storage and for the two offset positions.

A securing member 59 extends through the sliding member 51 in a biased manner and selectively engages a locking aperture within the vertical member 40 to secure the vertical member 40 substantially 90 degrees with respect to the base 20 as shown in FIGS. 7a through 7c of the drawings.

G. Support Wheels

FIG. 1a best illustrate a pair of support wheels 26 attached to the cross member 24. The support wheels 26 are preferably comprised of caster wheels with brakes incorporated within to allow for braking of the present invention. The caster wheels allow for free movement of the present invention near the vertical member 40.

H. End Wheel

FIG. 1a further illustrates an end wheel 30 attached to said distal end of said base 20 to provide for longitudinal movement of the present invention when engaging the ground surface. The end wheel 30 is designed for supporting the load of the door 12 and preferably is rotatable only about a horizontal axis that is substantially perpendicular to the base 20 to provide easy transportation of the door. The ability to rotate only about the horizontal axis, preferably parallel to the base 20, prevents the door 12 from unexpected moving when installing the door 12.

I. Secondary Wheel

A foot lever 34 is movably attached to the base 20 and a secondary wheel 32 is connected to the foot lever 34 as shown in FIGS. 1a and 1b of the drawings. The secondary wheel 32 is substantially transverse with respect to the end wheel 30 and elevates the base 20 member and the end wheel 30 when the foot lever 34 is depressed.

The secondary wheel 32 is mechanically connected to the foot lever 34 by a pair of lever members that are substantially parallel to one another attached to a vertical axle supporting the secondary wheel 32. The foot lever 34 is biased by a spring or other biasing member to maintain the secondary wheel 32 in an elevated state unless the foot lever 34 is depressed.

The secondary wheel 32 rotates about a rotational axis that is substantially parallel with respect to a longitudinal axis of the base 20 as shown in FIG. 1a of the drawings. The secondary wheel 32 allows for moving of the door 12 closer to the door jam during installation by rotating the distal end of the base 20 with respect to the vertical member 40.

What has been described and illustrated herein is a preferred embodiment of the invention along with some of its variations. The terms, descriptions and figures used herein are set forth by way of illustration only and are not meant as limitations. Those skilled in the art will recognize that many variations are possible within the spirit and scope of the invention, which is intended to be defined by the following claims (and their equivalents) in which all terms are meant in their broadest reasonable sense unless otherwise indicated. Any headings utilized within the description are for convenience only and have no legal or limiting effect.

I claim:

1. A door installation system, comprising:
   a base having a distal end and an inner end;
   a vertical member extending upwardly from said inner end of said base;
   a carriage supported upon said base, wherein said carriage includes a lip member for extending beneath a door to be installed or removed;
   a guide structure attached to an upper portion of said vertical member, wherein said guide structure is for guiding an upper portion of the door positioned upon said carriage;
   wherein said base includes a curved upper surface for pivoting said carriage upon;
   wherein said carriage is adjustable to adjust a roll angle and a pitch angle of the door positioned upon said carriage;
   wherein said vertical member is pivotally connected to said base; and
   a brace member having a first end and a second end, wherein said first end is pivotally connected to said base and wherein said second end is connected to said vertical member;
   wherein said base is positionable in a first offset position and a second offset position with respect to said vertical member which are offset with respect to a longitudinal axis of said vertical member;
   wherein said guide structure is comprised of a first guide member and a second guide member forming a receiver slot between thereof, wherein said first guide member and said second guide member extend substantially parallel with respect to one another and with respect to said base;
   wherein said first guide member and said second guide member are pivotally attached to said vertical member.

2. The door installation system of claim 1, wherein said base is comprised of an elongated structure.

3. The door installation system of claim 1, wherein said carriage is removable with respect to said base.

4. The door installation system of claim 1, wherein said second end of said brace member is slidably connected to vertical member.

5. The door installation system of claim 1, wherein said second end of said brace member is removably connected to said vertical member.

6. The door installation system of claim 1, wherein said base is slidably connected to said vertical member.

7. The door installation system of claim 1, including a locking device movably attached to said vertical member and engaging said base to maintain said base in either said first offset position or said second offset position.

8. The door installation system of claim 7, including a cross member attached to a lower end of said vertical member.

9. The door installation system of claim 1, including a pair of support wheels attached to said cross member and an end wheel attached to said distal end of said base.

10. The door installation system of claim 1, including a foot lever movably attached to said base and a secondary wheel connected to said foot lever, wherein said secondary wheel is substantially transverse with respect to said end wheel and wherein said secondary wheel elevates said base member and said end wheel when said foot lever is depressed.

11. The door installation system of claim 10, wherein said secondary wheel rotates about a rotational axis, wherein said rotational axis is substantially parallel with respect to a longitudinal axis of said base.

12. The door installation system of claim 1, wherein said guide structure is movable from left to right thereby manipulating a pitch angle of the door.

13. A door installation system, comprising:
    a base having a distal end and an inner end;
    wherein said base is comprised of an elongated structure;
    a vertical member extending upwardly from said inner end of said base;
    wherein said vertical member is pivotally connected to said base;
    wherein said base is slidably connected to said vertical member;
    wherein said base is positionable in a first offset position and a second offset position with respect to said vertical member which are offset with respect to a longitudinal axis of said vertical member;
    a locking device movably attached to said vertical member and engaging said base to maintain said base in either said first offset position or said second offset position;
    a carriage removably supported upon said base, wherein said carriage includes a lip member for extending beneath a door to be installed or removed;
    wherein said carriage is adjustable to adjust a roll angle and a pitch angle of the door positioned upon said carriage;
    wherein said base includes a curved upper surface for pivoting said carriage upon;
    a guide structure attached to an upper portion of said vertical member, wherein said guide structure is for guiding an upper portion of the door positioned upon said carriage;
    a brace member having a first end and a second end, wherein said first end is pivotally connected to said base and wherein said second end is connected to said vertical member;
    wherein said second end of said brace member is slidably connected to vertical member or removably connected to said vertical member;
    a cross member attached to a lower end of said vertical member;
    a pair of support wheels attached to said cross member;
    wherein said pair of support wheels are comprised of caster wheels;
    an end wheel attached to said distal end of said base;
    wherein said end wheel is rotatable only about a horizontal axis; and
    a foot lever movably attached to said base and a secondary wheel connected to said foot lever, wherein said secondary wheel is substantially transverse with respect to said end wheel and wherein said secondary wheel elevates said base member and said end wheel when said foot lever is depressed;

wherein said secondary wheel rotates about a rotational axis, wherein said rotational axis is substantially parallel with respect to a longitudinal axis of said base;

wherein said guide structure is movable from left to right thereby manipulating a pitch angle of the door;

wherein said guide structure is comprised of a first guide member and a second guide member forming a receiver slot between thereof, wherein said first guide member and said second guide member extend substantially parallel with respect to one another and with respect to said base;

wherein said first guide member and said second guide member are pivotally attached to said vertical member.

* * * * *